(12) United States Patent
Takeda et al.

(10) Patent No.: US 8,036,182 B2
(45) Date of Patent: Oct. 11, 2011

(54) COMMUNICATION SYSTEM AND COMMUNICATION CONTROL EQUIPMENT

(75) Inventors: Yukiko Takeda, Tokorozawa (JP); Hidenori Inouchi, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 1120 days.

(21) Appl. No.: 11/052,247

(22) Filed: Feb. 8, 2005

(65) Prior Publication Data

US 2005/0265276 A1 Dec. 1, 2005

(30) Foreign Application Priority Data

May 25, 2004 (JP) ................................. 2004-154078

(51) Int. Cl.
 *H04Q 7/24* (2006.01)
(52) U.S. Cl. .......................... 370/338; 370/349; 455/433
(58) Field of Classification Search .................. 370/328, 370/338, 349; 455/433
See application file for complete search history.

(56) References Cited

U.S. PATENT DOCUMENTS

| | | | |
|---|---|---|---|
| 6,404,754 B1 * | 6/2002 | Lim | 370/338 |
| 6,519,235 B1 * | 2/2003 | Kim et al. | 370/331 |
| 7,286,520 B2 * | 10/2007 | Takeda et al. | 370/349 |
| 2002/0161927 A1 * | 10/2002 | Inoue et al. | 709/245 |
| 2003/0093560 A1 * | 5/2003 | Ono et al. | 709/244 |
| 2003/0110292 A1 | 6/2003 | Takeda et al. | |
| 2004/0015607 A1 * | 1/2004 | Bender et al. | 709/238 |
| 2004/0105420 A1 * | 6/2004 | Takeda et al. | 370/349 |
| 2005/0021773 A1 * | 1/2005 | Shiga et al. | 709/228 |

OTHER PUBLICATIONS

Johnson, D., et al, "Mobility Support in IPv6", IETF Mobile IP Working Group, Jun. 30, 2003, pp. 1/187-6/187 and 15/187-18/187.
Narten, et al., "Neighbor Discovery for IPv6", Working Group, Standards Track, pp. 1/24-4/24 and 11/114-16/114, with date of Nov. 5, 2004.
Rosenberg, et al., "SIP: Session Initiation Protocol", Working Group, Standards Track, pp. 1/328-10/328 and 12/79-21/79, with date of Nov. 5, 2004.
Day, et al., "A Model for Presence and Instant Messaging", Working Group, Informational , pp. 1/21-21/21, with date of Nov. 5, 2004.
Roach, et al,, "SIP—Specific Event Notification", Working Group, Standards Track, pp. 1/47-5/47, with date of Nov. 5, 2004.
T. Kimura et al., "A Study on Mobility Control System with Interoperation between Network and Application Layer Mobility", Technical Report of IEICE, The Institute of Electronics, Information and Communication Engineers, in 2003-95, Oct. 2003, pp. 31-36, cover pages.
Japanese Patent Office Office Action dated Dec. 24, 2008, in Japanese with English translation.
Office Action from Japanese Patent Office dated Aug. 12, 2009.
Kent Leung et al., "Home Agent Redundancy in Mobile IP", Internet Draft, Dec. 2001, 14 pages.

\* cited by examiner

*Primary Examiner* — Nhan Le
(74) *Attorney, Agent, or Firm* — Stites & Harbison PLLC; Juan Carlos A. Marquez, Esq.

(57) ABSTRACT

Mobile IPv6 assigns MN (Mobile Node) with a fixed home address in order to guarantee an arrival to MN 7. A SIP process of HA (Home Agent) 2 is provided with a unit for notifying Binding information of MN to a presence server 1. Alternatively, the presence server 1 is provided with a unit for requesting HA 2 for the Binding information of MN. An information delivery server 3 is provided with a unit for acquiring a Care of Address of MN from the presence server 1 and selecting information corresponding to the Care of Address. Presence service can be provided to MN existing in a network other than a home network.

10 Claims, 24 Drawing Sheets

FIG.3A

210 HA INFORMATION MANAGEMENT TABLE (PRESENCE SERVER)

| SIP URI | MN HOME ADDRESS | HA ADDRESS | PRESENCE INFORMATION REQUEST | EXPIRE | |
|---|---|---|---|---|---|
| sip:mn@example.com | 2000:0:0:102::111 | 2000:0:0:102::7 | YES | | 210-1 |
| | | | | | 210-2 |
| | | | | | 210-n |

Columns: 211, 212, 213, 214, 215

FIG.3B

220 MN INFORMATION MANAGEMENT TABLE (PRESENCE SERVER)

| SIP URI | MN HOME ADDRESS | MN CARE OF ADDRESS | EXPIRE | |
|---|---|---|---|---|
| sip:mn@example.com | 2000:0:0:102::111 | 3000:300:1:2::100 | | 220-1 |
| | | | | 220-2 |
| | | | | 220-n |

Columns: 221, 222, 223, 224

FIG.3C

240 PERMISSION INFORMATION MANAGEMENT TABLE (PRESENCE SERVER)

| SIP URI | SOURCE OF PRESENCE INFORMATION REQUEST | PERMISSION | |
|---|---|---|---|
| sip:mn@example.com | 2000:0:0:102::/64 | PERMIT | 240-1 |
| | | | 240-2 |
| | | | 240-n |

Columns: 241, 242, 243

FIG.5A

310 BINDING CACHE MANAGEMENT TABLE (HA)

| HOME ADDRESS | CARE OF ADDRESS | LIFETIME | |
|---|---|---|---|
| 2000:0:0:102::111 | 3000:300:1:2::100 | | | 310-1
| | | | | 310-2
| | | | | 310-n

FIG.5B

320 PRESENCE SERVER ADDRESS MANAGEMENT TABLE FOR NOTIFYING BINDING INFORMATION (HA)

| 321 | 322 | 323 | 324 | 325 | 326 | |
|---|---|---|---|---|---|---|
| SIP URI | HOME ADDRESS | PRESENCE SERVICE SUBSCRIPTION | PRESENCE SERVER ADDRESS | RECEIVE PRESENCE INFORMATION REQUEST OR NOT | TIMER | |
| sip:mn@example.com | 2000:0:0:102::111 | YES | 2000:0:0:102::10 | YES | | 320-1 |
| | | | | | | 320-2 |
| | | | | | | 320-n |

FIG.7A

250 MN INFORMATION MANAGEMENT TABLE (INFORMATION DELIVERY SERVER)

| SIP URI | MN HOME ADDRESS | MN CARE OF ADDRESS | EXPIRE | |
|---|---|---|---|---|
| mn@example.com | 2000:0:0:102::111 | 3000:300:1:2::100 | | 250-1 |
| | | | | 250-2 |
| | | | | 250-n |

Columns: 251, 252, 253, 254

FIG.7B

260 DELIVERY INFORMATION MANAGEMENT TABLE (INFORMATION DELIVERY SERVER)

| CARE OF ADDRESS | LOCATION INFORMATION | DELIVERY INFORMATION | |
|---|---|---|---|
| 3000:300:1:2::/64 | | α | 260-1 |
| | | | 260-2 |
| | | | 260-n |

Columns: 261, 262, 263

FIG.8

S1 SIP MESSAGE EXAMPLE start-line
: NOTIFY sip:user@presence.example.com SIP/2.0

433 message
-header
434
:
```
Via: SIP/2.0/UDP ha.example.com;branch=z9hG4bKnasaii
From: sip:mn@example.com;tag=xyzygg
To: sip:user@presence.example.com;tag=123aa9
Call-ID: 9987@presence.example.com
CSeq: 1288 NOTIFY
Contact: sip:ha.example.com
Event: presence
Max-Forwards: 70
Content-Type: application/xxx
Content-Length: ...
``` message
-body
435
:
```
<?xml version="1.0"?>
<xxxx: presence
    :
    entity="sip:mn@example.com" >
  <xxxx:tuple id="77ajsyy76">
    <xxxx:status>
        subscribe
    </xxxx:status>
    <xxxx:contact>
        home-address="2000:0:0:102::111"
        care-of-address="3000:300:1:2::100"
    </xxxx:contact>
  </xxxx:tuple>
</xxxx:presence>
```

FIG.18

230 ORIGINATING/TERMINATING INFORMATION MANAGEMENT TABLE
(PRESENCE SERVER)

| ╱―231 | ╱―232 | ╱―233 | |
|---|---|---|---|
| CARE OF ADDRESS | ORIGINATING CALL INFORMATION (ALLOW/REFUSE) | TERMINATING CALL INFORMATION (ALLOW/REFUSE) | |
| 3000:300:1:2::/64 | ALLOW ORIGINATING CALL | REFUSE TERMINATING CALL | ╱―230-1 |
| | | | ╱―230-2 |
| | | | ╱―230-n |

FIG.22

330 MN INFORMATION MANAGEMENT TABLE (SIP SERVER)

| SIP URI | MN HOME ADDRESS | MN CARE OF ADDRESS | EXPIRE | |
|---|---|---|---|---|
| sip:mn@example.com | 2000:0:0:102::111 | 3000:300:1:2::100 | | 330-1 |
| | | | | 330-2 |
| | | | | 330-n |

331, 332, 333, 334

COMMUNICATION SYSTEM AND COMMUNICATION CONTROL EQUIPMENT

INCORPORATION BY REFERENCE

The present application claims priority from Japanese application JP2004-154078 filed on May 25, 2004, the content of which is hereby incorporated by reference into this application.

BACKGROUND OF THE INVENTION

1. Field of the Invention

The present invention relates to a communication control method for a communication control equipment connected to a network. More particularly, the present invention relates to a mobil communication control equipment, an information management equipment and a communication service control method. Among others, the present invention relates to a mobile communication control equipment in a mobile communication system adopting a Mobile IP protocol and an information management equipment in a communication system adopting an SIP protocol.

2. Description of the Related Art

Studies on the IP (Internet Protocol) for a mobile communication network are becoming vigorous nowadays. The IETF (Internet Engineering Task Force) is trying to standardize the specifications of Mobile IPv6 (e.g., refer to Mobility Support in IPv6<draft-ietf-mobileip-ipv6-24.txt>, Work in Progress §4.1). The constituent elements of a Mobile IPv6 network include a mobile node (MN), a home agent (HA) and a correspondent node (CN). MN is given an unique IP address (home address) which will not change even after movement of MN. A link having the same prefix as that of the home address is called home link. The prefix is a network portion of the IP address. As MN moves to a link other than the home link (a link at the movement destination is called visited link), MN acquires an IP address in the visited link. This address is called Care of Address (hereinafter represented by CoA). Application of MN performs communications by using the home address. The application of MN can perform communications without using CoA.

When MN moves to a visited link, it receives router advertisements periodically transmitted from a router existing in the visited link. MN knows the movement from the home link to the visited link, by detecting the prefix which is different from that of the home address and is contained in the router advertisement. A router advertisement message is defined in Neighbor Discovery for IPv6 (refer to IETF RFC2461, Neighbor Discovery for IP Version 6 (IPv6) §3). This message is used to notify another node in the same link of the presence of the router. When MN knows the movement to the visited link, it registers its location in HA. HA stores, in a Binding Cache, correspondence information (binding information) between a Care of Address and the home address of MN existing in a link other than the home link. In order to capture a packet transmitted from CN to the home address of MN, HA multicasts a Gratuitous Neighbor Advertisement to operate as a proxy of MN.

In the following, description will be made on a process of transmitting a packet from CN to MN.

CN transmits a packet to the home address of MN. HA captures the packet destined to the home address of MN. HA searches data in the Binding Cache to acquire CoA corresponding to the home address of MN. HA adds (encapsulates) an IP header for CoA destination to the received packet and transmits it. A capsulation section between HA-MN is called mobile tunnel. When MN receives the packet destined to CoA, it removes (decapsulates) the previously added IP header to recover the original packet. MN may perform route optimization by notifying CN of the binding information of MN itself.

SIP (Session Initiation Protocol) has been paid attention as a session control protocol for an IP network (refer to IETF RFC3261, SIP: Session Initiation Protocol §4). SIP is the protocol for session control of IP multimedia communications standardized by the IETF. Typical Service utilizing SIP is VoIP (Voice over IP). VoIP pertains to technologies of sending/receiving voice information over an IP network. For VoIP communications by SIP, a virtual communication path (session) is set between communication apparatuses prior to starting communications. IP-packetized voice data is transferred on the set communication path. In VoIP communications, SIP creates, maintains and terminates sessions between communication apparatuses.

The IETF is under studies on the concept ""presence"" (e.g., refer to IETF RFC2778, A model for Presence and Instant Messaging §2.1). The presence indicates presence information and a state of a terminal. Service of notifying the presence of a communication partner is called presence service. SIP is provided with a function of requesting and notifying an event (hereinafter called event notification function). The IETF is under studies on a transmission/reception method for presence information utilizing the event notification function of SIP (e.g., refer to IETF RFC3625, Session Initiation Protocol (SIP)-Specific Event Notification §1.1).

In a conventional presence service providing system, a terminal providing presence information supplies a presence server with location information (e.g., an IP address) and the like, and another terminal referring to presence information refers to the presence information stored in the presence server, using the event notification function. The presence server received the event notification function may authenticate the terminal by referring to the presence information. In accordance with the authentication result, the presence server controls open/not-open of the presence information.

In a conventional Mobile IP communication system, application of a mobile terminal uses a home address for communications, and does not use a Care of Address. Therefore, the application of the mobile terminal does not notify a Care of Address to a communication apparatus such as a presence server. A presence service providing method for a Mobile IP compatible mobile terminal is as follows, which is conceivable when a conventional communication control method is used.

First, a mobile terminal registers its Mobile IP location in HA. Next, the mobile terminal notifies a presence server of the presence information of the terminal. Although the presence information contains in some cases an IP address, this notified IP address is the home address. Next, an information delivery server acquires the presence information of the mobile terminal from the presence server. This presence information contains in some cases the home address of the mobile terminal. Therefore, when the information delivery server provides service by using the IP address of the mobile terminal, it is necessary to use the home address as the IP address, posing the problem that service cannot be provided to a Care of Address of the mobile terminal.

The service to a Care of Address may be information delivery service, originating call restriction service, terminating call restriction service in a network visited by a mobile terminal. If Mobile IP route optimization is performed, MN notifies arbitrary communication partners of binding information, posing the problem that security cannot be maintained.

SUMMARY OF THE INVENTION

An object of the present invention is to provide presence service to a Mobile IP compatible mobile terminal.

More specifically, the object of the present invention is to provide a communication method of providing a Mobile IP compatible mobile terminal existing in a network other than a home network with "service such as information delivery" in a visited network.

Another object of the present invention is to provide a communication method capable of communication control of a mobile terminal which control matches a network to which the mobile terminal is connected.

Another object of the present invention to provide a communication method capable of providing "service such as information delivery" matching a network to which a mobile terminal is connected, without making open the binding information of the mobile terminal to arbitrary communication partners.

In order to solve the above-described problems, the present invention is provided with at least the following means:

(1) A communication apparatus having a Binding Cache function is provided with a SIP communication function. A communication apparatus having a presence terminal management function comprises means for requesting mobile terminal information from the communication apparatus having the Binding Cache, and means for receiving the mobile terminal information. The communication apparatus having the Binding Cache function comprises means for notifying the communication apparatus of binding information of a corresponding mobile terminal when a request for the mobile terminal information is received from the communication apparatus having the presence information management function.

(2) Alternatively, a communication apparatus having the Binding Cache function is provided with the SIP communication function. The communication apparatus may comprise means for notifying a communication apparatus having the presence information of the binding information when a packet including a location registration message is received from a mobile terminal. The communication apparatus may further comprise means for referring to subscriber information when the packet including the location registration message is received.

(3) A communication apparatus is provided with a function of providing communication service corresponding to location information. The communication apparatus comprises means for acquiring a Care of Address of a mobile terminal from a communication apparatus having the presence management function and means for providing communication service corresponding to the Care of Address of the mobile terminal.

The present invention provides a communication control method and a communication apparatus in order to provide communication service to a Mobile IP compatible mobile terminal in a visited network. More specifically, a communication apparatus having the Binding Cache function notifies location information of a mobile terminal to a communication apparatus having the presence information management function. It is therefore possible to control open/not-open of the location information of the Mobile IP compatible mobile terminal and maintain security. Further, since a communication apparatus having a function of providing communication service corresponding to location information acquires a Care of Address of the Mobile IP compatible mobile terminal from the presence information management function, it is possible to provide the Mobile IP compatible mobile terminal with service corresponding to the Care of Address.

Other objects, features and advantages of the invention will become apparent from the following description of the embodiments of the invention taken in conjunction with the accompanying drawings.

BRIEF DESCRIPTION OF THE DRAWINGS

FIG. 3A is a diagram showing an HA information management table in the presence server 1.

FIG. 3B is a diagram showing an MN information management table in the presence server 1.

FIG. 3C is a diagram showing a permission information management table in the presence server 1.

FIG. 5A is a diagram showing a Binding Cache management table in HA 2.

FIG. 5B is a diagram showing a presence server address management table in HA 2 for notifying Binding information.

FIG. 7A is a diagram showing an MN information management table in the information delivery server 3.

FIG. 7B is a diagram showing a delivery information management table in the information delivery server 3.

FIG. 8 shows an example of a SIP message.

FIG. 18 is a diagram showing an originating/terminating information management table in the presence server 1 according to the third embodiment.

FIG. 22 is a diagram showing an MN information management table for a Binding information process 48 in the SIP server 4 according to the fourth embodiment.

DESCRIPTION OF THE EMBODIMENTS

1. First Embodiment

The first embodiment of the present invention will be described with reference to the accompanying drawings.

Detailed description will be given as a typical case, on a communication method to be performed when a Mobile IPv6 compatible mobile node (MN) moves to a network (hereinafter called visited network) other than a home link (hereinafter called home network).

Figure 1:
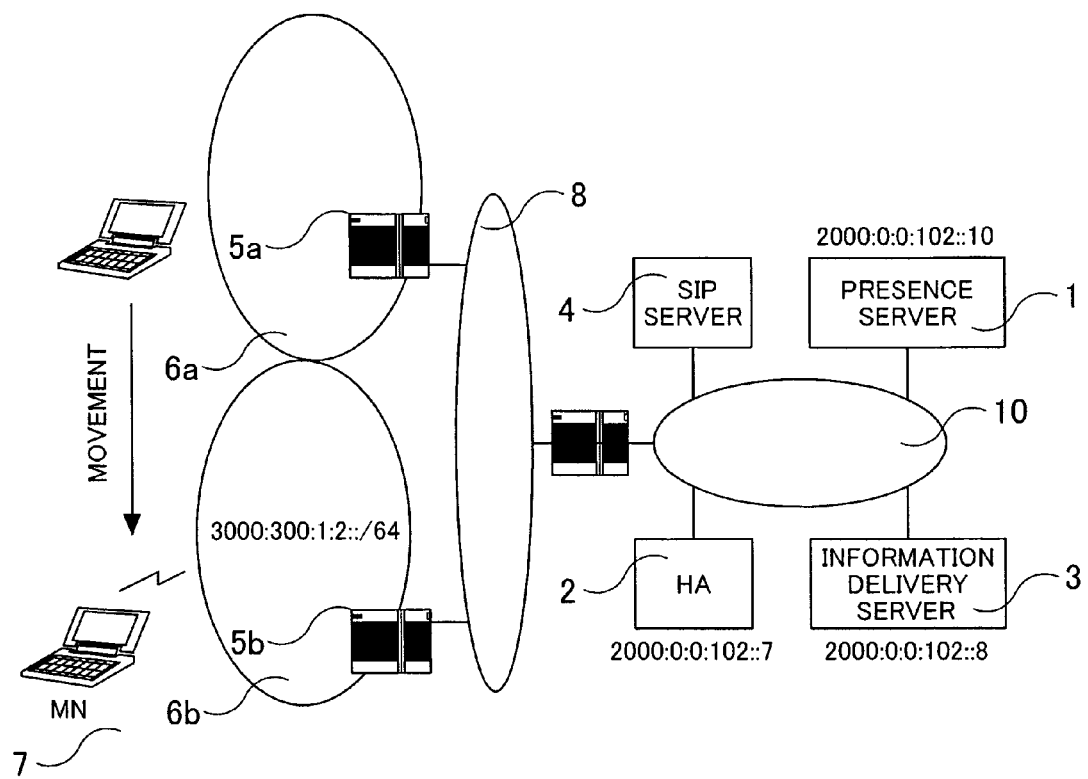
FIG. 1 is a diagram showing an example of the configuration of a communication network of the present invention.

FIG. 1 shows an example of the configuration of a communication network of the present invention. The communication network of the present invention is constituted of a home network 10 of MN 7, an IP network 8 and a visited network 6 (6a, 6b). In this embodiment, the home network 10, IP network 8 and visited network 6 are all IPv6 networks. MN 7 is a Mobile IPv6 compatible mobile node (MN). The home network 10, IP network 8 and visited network 6 may be an IPv4 network or other networks and MN 7 may be a terminal in conformity with Mobile IPv4 or other protocols, so long as they have the configuration providing the effects of the present invention.

The visited network 6 and IP network 8, and the IP network 8 and home network 10 are connected via a router or a gateway apparatus. The visited network 6 and home network 10 may be connected via a router or a gateway apparatus. The home network 10 has a presence server 1, an HA 2, an information delivery server 3 and a SIP server 4. The visited network 6 (6a, 6b) has a router 5 (5a, 5b) having an interface with the IP network 8.

HA 2 is a Mobile IPv6 compatible home agent (HA). HA 2 manages location information of MN 7 existing in a network other than the home network 10. The location information is binding information between the home address and a Care of Address of MN. HA 2 has a function of capturing a packet transmitted from a correspondent node to the home address of MN 7 and transferring the packet to MN 7 existing in the visited network 6b. MN 7 has a Mobile IP compatible mobile terminal function and a function of processing a SIP protocol. MN 7 has a SIP URL as a SIP identifier.

Figure 2:
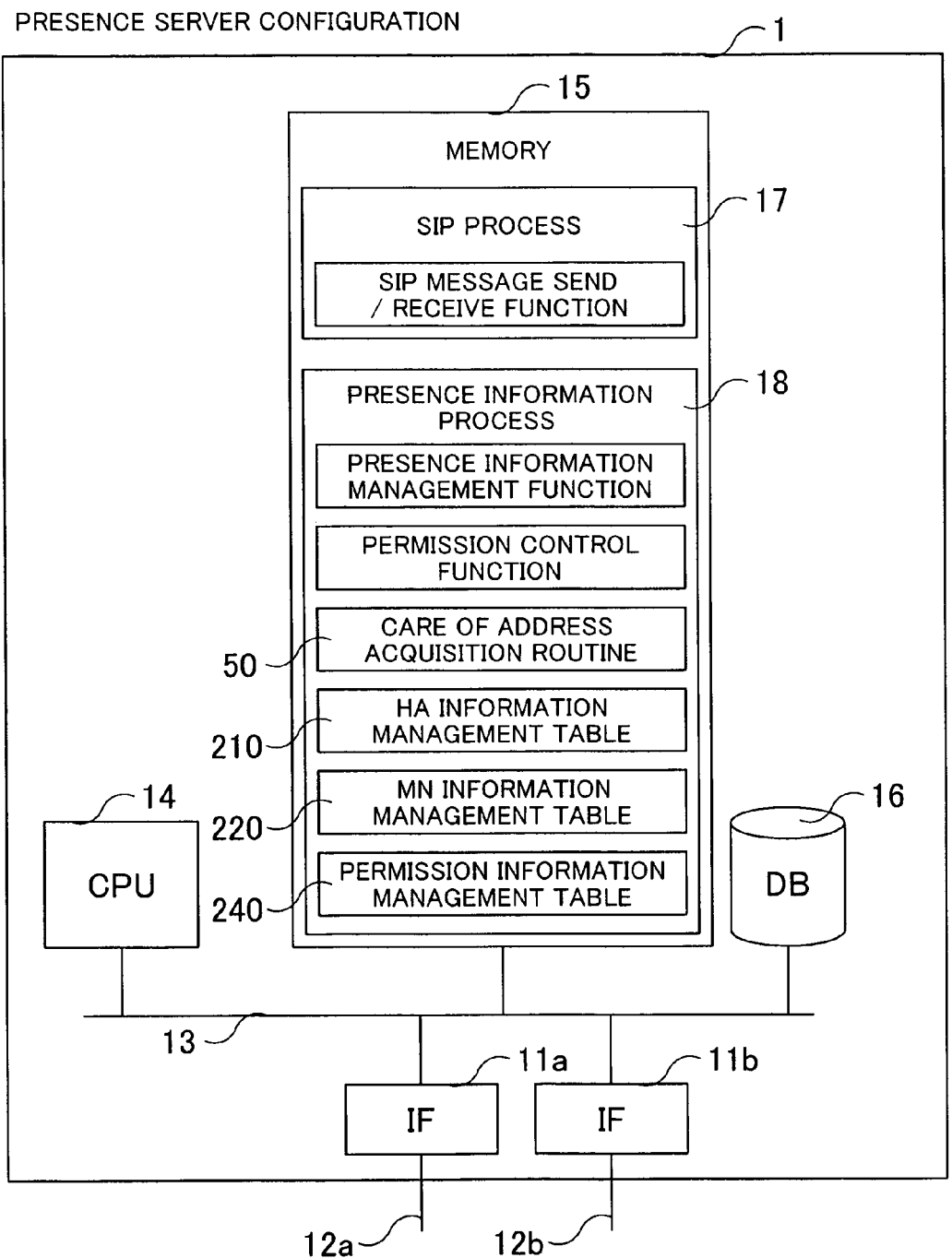
FIG. 2 is a block diagram of a presence server 1.

FIG. 2 shows an example of the configuration of the presence server 1. The presence server 1 is constituted of an interface (IF) unit 11 (11a, 11b) accommodating a line 12 (12a, 12b), a CPU 14, a memory 15 and a database 16. Respective constituent elements are connected by a bus 13.

The memory 15 stores programs for executing a SIP process 17 and programs for executing a presence information process 18. The SIP process 17 has a function of sending/receiving a SIP message. The presence information process 18 has a function of managing the presence information of terminals and a permission control function of controlling open/not-open of the presence information. The presence information process 18 includes an HA information management table 210, an MN information management table 220, and a permission information management table 240. The database 16 may include the HA information management table 210, MN information management table 220, and permission information management table 240.

FIG. 3A shows an example of the table form of the HA information management table 210. The HA information management table 210 stores the correspondence relation between a SIP URI 211 as the MN SIP identifier, and at least an MN home address 212, an MN HA address 213 and presence/absence of a presence information request 214. For example, an entry 210-1 stores the correspondence relation between an SIP URI (sip:mn@example.com), a home address (2000:0:0:102::111), an HA address (2000:0:0:102::7), and presence/absence of a presence information request. The HA information management table 210 may include an expiration term 215 representative of the expiration term of the presence information request. If the HA information management table 210 includes the expiration term 215, the presence server 1 can designate the presence information request expiration term. If the presence server 1 uses the protocol other than SIP, the HA information management table 210 stores the correspondence relation at least between the MN home address 212 and the MN HA address 213.

FIG. 3B shows an example of the table form of the MN information management table 220. The MN information management table 220 stores the correspondence relation between a SIP URI 221 as the SIP identifier of MN, and at least an MN home address 222, an MN Care of Address 223. For example, an entry 220-1 stores the correspondence relation between an SIP URI (sip:mn@example.com), a home address (2000:0:0:102::111) and a Care of Address (3000:300:1:2::100). The MN information management table 220 may include an expiration term 224 of the MN binding information. If the MN information management table 220 includes the expiration term 224, the presence server 1 can delete the MN entry over the expiration term. If the presence server 1 uses the protocol other than SIP, the MN information management table 220 stores the correspondence relation at least between the MN home address 222 and the MN Care of Address 223.

FIG. 3C shows an example of the table form of the permission information management table 240. The permission information management table 240 stores the correspondence relation between a SIP URI 241 as the SIP identifier of MN, and at least a source 242 of a presence information request and a permission 243. The source 242 of the presence information request is designated by an IP address of the source of the presence information request, a prefix of the IP address, an SIP URL or the like. For example, an entry 240-1 stores the correspondence relation between an SIP URI (sip:mn@example.com), a source of a presence information request (2000:0:0:102::/64) and a permission.

Figure 4:
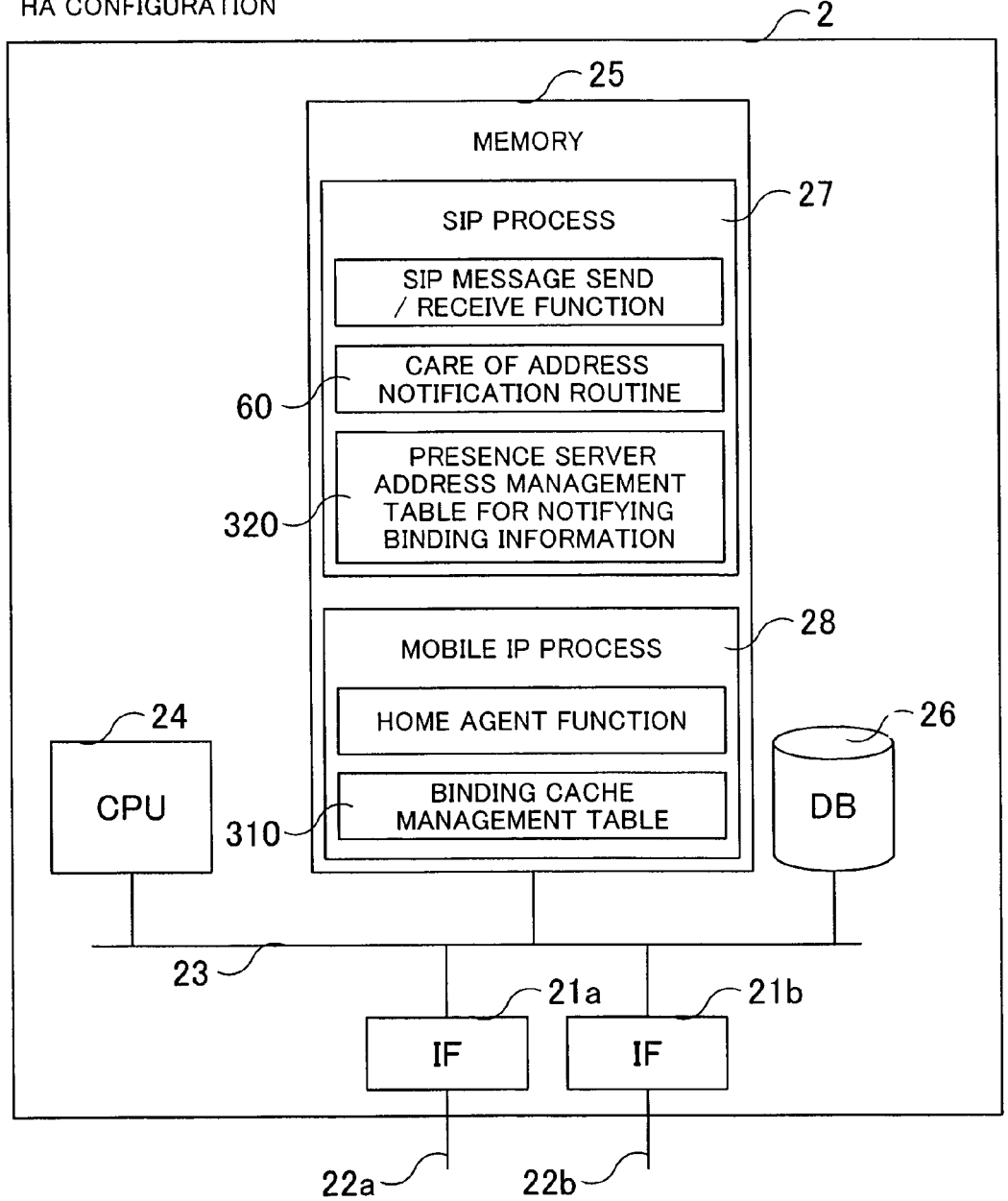
FIG. 4 is a block diagram showing the configuration of an HA 2.

FIG. 4 shows an example of the configuration of HA 2. HA 2 is constituted of an interface (IF) unit 21 (21a, 21b) accommodating a line 22 (22a, 22b), a CPU 24, a memory 25 and a database 26. Respective constituent elements are connected by a bus 23.

The memory 25 stores programs for executing a SIP process 27 and programs for executing a Mobile IP process 28. The SIP process 27 has a function of sending/receiving a SIP message. The SIP process 27 includes a presence server address management table 320 for notifying Binding information. The Mobile IP process 28 has a function of sending/receiving a Mobile IP message and a home agent function of Mobile IP. The Mobile IP process 28 includes a Binding Cache management table 310. The database 26 may include the Binding Cache management table 310 and the presence server address management table 320 for notifying Binding information.

FIG. 5A shows an example of the table form of the Binding Cache management table 310. The Binding Cache management table 310 stores the correspondence relation between an MN home address 311 and at least Care-of Address (CoA) 312 acquired by MN in a visited network. For example, an entry 310-1 stores the correspondence relation between a home address (2000:0:0:102::111) and a Care of Address (3000:300:1:2::100). The Binding Cache management table 310 may include a lifetime 313 representative of the expiration term of the Binding Cache. If the Binding Cache management table 310 includes the lifetime 313, HA 1 can delete the entry over the expiration term from the table.

FIG. 5B shows an example of the table form of the presence server address management table 320 for notifying Binding information. The presence server address table 320 for notifying Binding information stores the correspondence relation between a SIP URI 321 as the SIP identifier of MN, and at least an MN home address 322 and a presence server address 324. For example, an entry 320-1 stores the correspondence relation between a SIP URI (sip:mn@example.com), a home address (2000:0:0:102::111) and a presence server address (2000:0:0:102::10).

The presence server address table 320 for notifying Binding information may store the correspondence relation between a presence service subscription 323 indicating whether MN subscribes already to the presence service and a presence information acquisition request 325. The presence server address table 320 for notifying Binding information may include a timer 326 indicating a presence service information notification term. If the presence server address table 320 for notifying Binding information includes the timer 326, the expiration term for the presence information acquisition request can be set. If HA 2 uses the protocol other than SIP, the presence server address table 320 for notifying Binding information stores the correspondence relation at least between the MN home address 322 and the presence server address 324.

Figure 6:
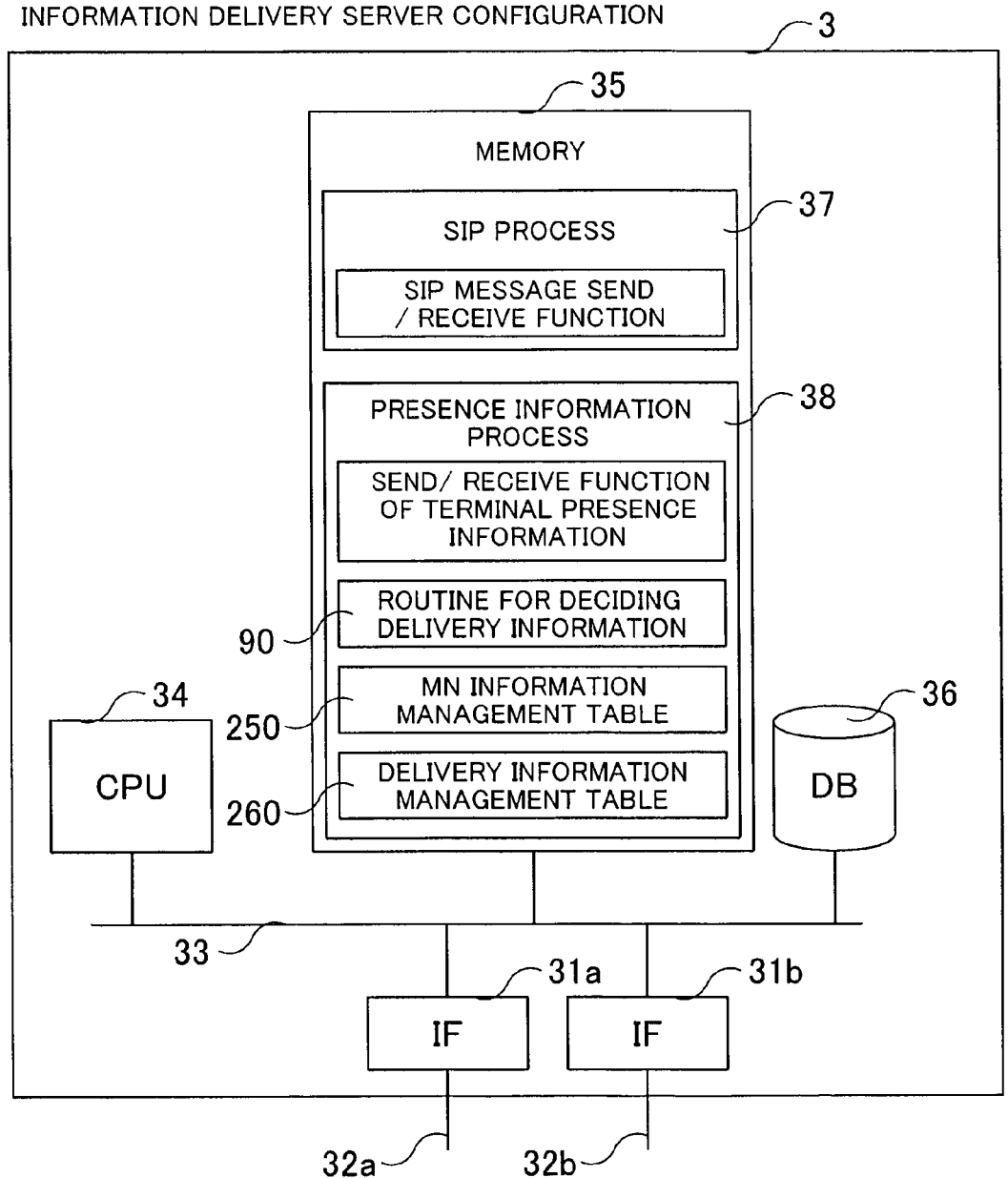
FIG. 6 is a block diagram showing the configuration of an information delivery server 3.

FIG. 6 shows an example of the configuration of the information delivery server 3. The information delivery server is constituted of an interface (IF) unit 31 (31a, 31b) accommodating a line 32 (32a, 32b), a CPU 34, a memory 35 and a database 36. Respective constituent elements are connected by a bus 33.

The memory 35 stores programs for executing a SIP process 37 and programs for executing a presence information process 38. The SIP process 37 has a function of sending/receiving a SIP message. The presence information process 38 has a function of sending/receiving presence information to/from a terminal. The presence information process 38 includes an MN information management table 250 and a delivery information management table 260. The database 36 may include the MN information management table 250 and the delivery information management table 260.

FIG. 7A shows an example of the table form of the MN information management table 250. The MN information management table 250 stores the correspondence relation between a SIP URI 251 as the SIP identifier of MN, and at least an MN home address 252 and a Care-of Address (CoA) 253 acquired by MN in a visited network. For example, an entry 250-1 stores the correspondence relation between a SIP URI (sip:mn@example.com), a home address (2000:0:0:102::111) and a Care of Address (3000:300:1:2::100). The MN information management table 250 may include an expiration term 254. If the MN information management table 250 includes the expiration term 254, the information delivery server 3 can delete the entry over the expiration term from the table. If the information delivery server 3 uses the protocol other than SIP, the MN information management table 250 stores the correspondence relation at least between the MN home address 2252 and the Care of Address (CoA) 253 acquired by MN in a visited network.

FIG. 7B shows an example of the table form of the delivery information management table 260. The delivery information management table 260 stores the correspondence relation at least between an MN Care of Address 261 and delivery information 263. The prefix of the Care of Address may be set as the MN Care of Address 261. For example, an entry 260-1 stores the correspondence relation between a Care of Address (3000:300:1:2::/64) and delivery information (α). The delivery information management table 260 may store location information 262.

Next, the format of an IPv6 packet will be described. The IPv6 packet is constituted of an IPv6 header, an extension header, and a payload disposed in this order. The IPv6 header includes a source address and a destination address. In the following description although an IPv6 packet in conformity with this format is used, other packets such as an IPv4 packet in conformity with the protocol other than IPv6 may also be used so long as they provide the effects of the present invention.

Next, the format of a packet containing a SIP message will be described. The SIP message is stored in the data field of a transport protocol such as TCP/UDP. The header and data field of the transport protocol are stored in the payload of the IPv6 packet format. In the following description although a SIP message in conformity with this format is used, other messages in conformity with the protocol other than SIP may also be used so long as they provide the effects of the present invention.

FIG. 8 shows an example S1 of a SIP message. The SIP message is constituted of at least a start-line 433 indicating a request or a response and a message-header 434 in which parameters of the SIP message are set. When media information and the like and presence information to be used for inter-terminal communications are to be transmitted by using the SIP message, the SIP message contains a message-body 435 storing these pieces of information.

Next, the format of a Binding Update message will be described. The Binding Update message is constituted of a Destination Options Header and an IPv6 Mobility Header. These headers are stored in the extension header of an IPv6 packet. The following values are stored in a Binding Update to be transmitted from MN 7 to HA 2. An address of HA 2 is set to the destination address in the IPv6 packet header. A Care of Address acquired by MN 7 in a visited network 6 is set to the source address in the IPv6 packet header. If the value different from the home address of MN 7 is set to the source address, the home address of MN 7 is stored in a Home Address field in the Destination Options Header.

Figure 14:
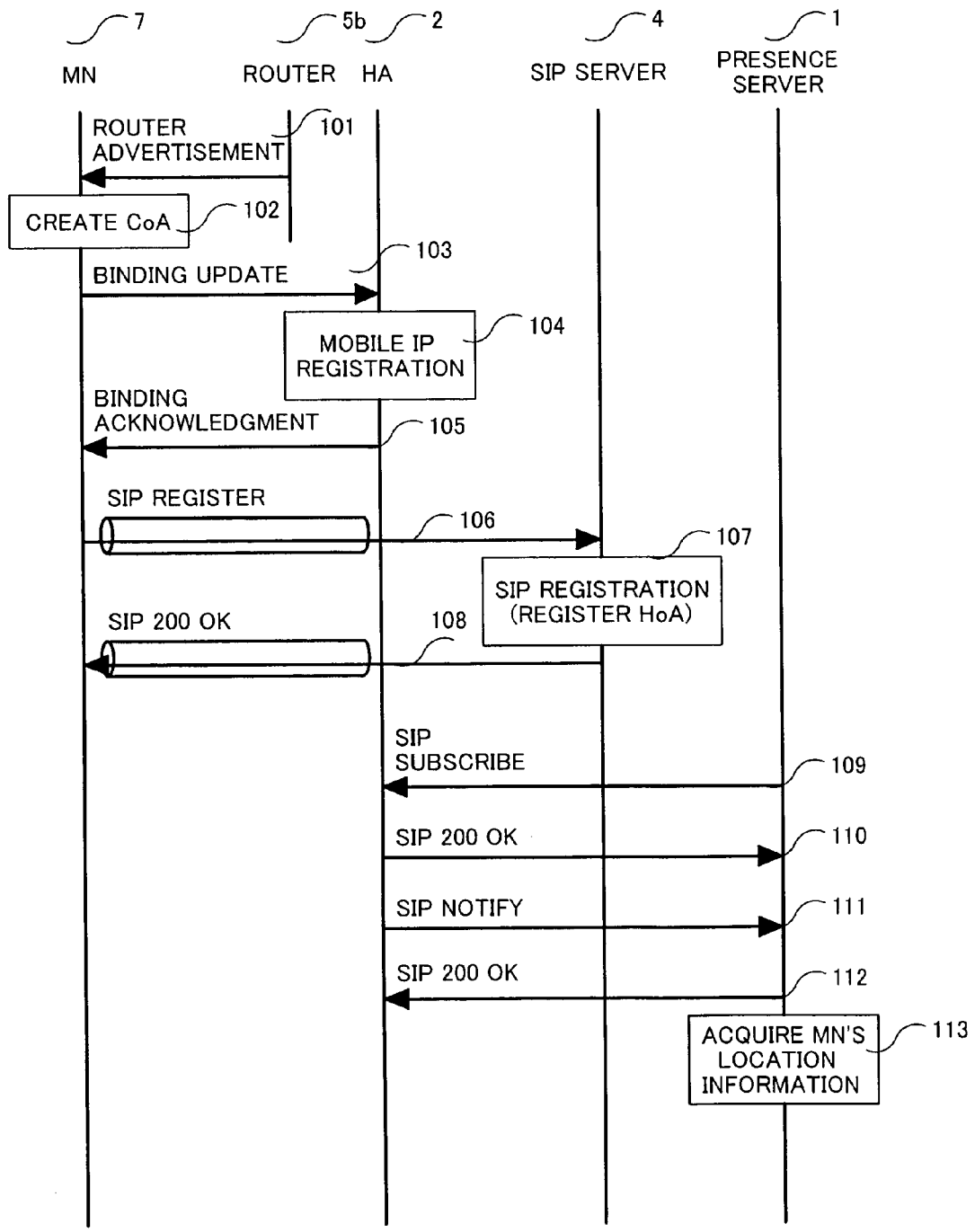
FIG. 14 is a sequence diagram illustrating location registration—presence information notification according to the first embodiment.
Figure 15:
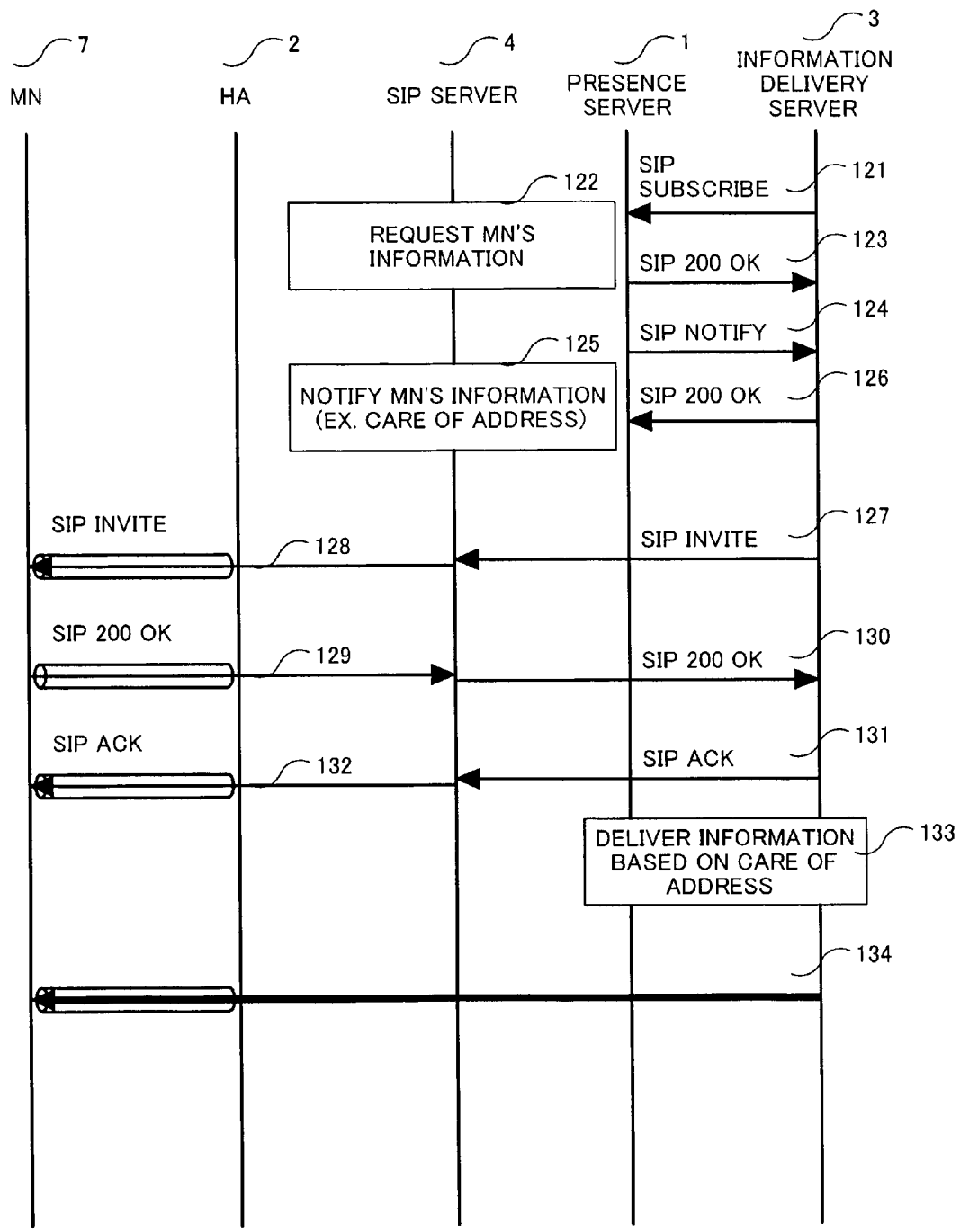
FIG. 15 is a sequence diagram illustrating packet transmission/reception.

With reference to the sequence diagrams shown in FIGS. 14 and 15, description will be made on a sequence whereby MN 7 arrived in the network 6b shown in FIG. 1 registers its location in HA 2 and receives a packet by using the presence service. First, with reference to FIG. 14, description will be made on a sequence whereby the presence server 1 acquires location registration information of MN 7 from HA 2.

In the first embodiment, HA 2 has the Care of Address notification routine 60. The presence server 1 has the Care of Address acquisition routine 50. It is assumed that the HA information management table 210 in the presence server 1 has at least a "home address" and an "HA address" set to "SIP URI".

MN 7 receives a Router Advertisement from the router 5b belonging to the visited network 6b (101), and acquires a CoA (102). MN 7 acquired CoA (3000:300:1:2::100) in the visited network transmits a location registration message (Binding Update) to HA 2 (103). The following values are stored in the Binding Update. CoA of MN 7 is set to the source address in the IPv6 packet header. A home address (2000:0:0:102::111) of MN 7 is set to the Home Address field in IPv6 Destination Options Header.

In the Mobile IP process 28 of HA 2, the Binding Update is received and the location registration process for MN 7 is executed (104). In the Mobile IP process 28, the Binding Cache management table 310 is searched by using the home address of MN 7 as a search key. If an entry of MN 7 does not exist in the Binding Cache management table 310, an entry of MN 7 is added to the Binding Cache management table 310. CoA acquired by MN 7 in the visited network 6b is set to the Care of Address 312 in the entry. After the location registration, the Mobile IP process 28 of HA 2 transmits a response (Binding Acknowledgement) to the Binding Update, to MN 7 (105). HA 2 operates as a proxy of MN 7.

Upon reception of the Binding Acknowledgement indicating a normal completion (105), MN 7 starts SIP location registration relative to the SIP server 4. MN 7 transmits a SIP location registration request message (REGISTER) to the SIP server 4 via HA 2 (106). More specifically, an original IP packet containing the REGISTER message is transmitted to HA 2 by encapsulating it with an IPv6 header having a destination address of HA 2, and HA 2 removes (decapsulates) the encapsulated IPv6 header from the received packet and transmits the original IP packet to the SIP server 4.

Upon reception of the SIP location registration request message (REGISTER), the SIP server 4 performs SIP location registration. More specifically, the correspondence relation between the SIP URI (sip:mn@example.com) and home address (2000:0:0:102::111) of MN is stored (107). After the SIP location registration, the SIP server 4 transmits a response message ("200 OK") to the SIP location registration request, to MN 7 (108). If the SIP location registration request message is transmitted via HA 2 (106), the response message is transferred to MN 7 via HA 2. In this case, the IP packet containing the response message and transmitted from the SIP server 4 is encapsulated at HA 2 by the IP header having the destination address of CoA and transferred to MN 7 (108).

The above-described location registration in HA 2 and SIP server 4 is repetitively executed at a predetermined period even if MN 7 is resident in the same visited network, in order to update the Binding Cache management table 310 managed by HA 2 and the entry expiration term in the SIP location registration information managed by the SIP server 4.

Next, with reference to also the flow chart of FIG. 9, description will be made on the sequence whereby the presence server 1 collects information of MN 7 from HA 2.

The presence server 1 has the Care of Address acquisition routine 50 in the presence information process 18. The presence server 1 activates the Care of Address acquisition routine 50 in order to collect the Care of Address of MN 7. First, the HA information management table 210 is searched by using SIP URI of MN 7 as a search key. If an entry of MN 7 exists in the HA information management table 210, an HA address of MN 7 is acquired from the HA information management table 210. The presence server 1 acquires an address (2000:0:0:102::7) of HA 2 as the HA address of MN 7, and transmits a SIP SUBSCRIBE message to HA 2 (51, 109). The SIP SUBSCRIBE message is set with SIP URI (m@example.com) of MN 7, an address (2000:0:0:102:10) of the presence server 1 and the expiration term. Thereafter, the presence server 1 waits for a response to the SUBSCRIBE message (52). If the expiration term of SUBSCRIBE expires during this wait for the response, the presence server 1 terminates this routine.

If it is judged at Step 51 that a corresponding entry does not exist in the HA information management table 210, the presence server 1 terminates this routine.

The following description will be made with reference to also the flow chart of FIG. 10. In the SIP process 27 of HA 2, upon reception of the SUBSCRIBE message (109), the presence server address management table 320 for notifying Binding information is searched by using SIP URI (mn@example.com) of MN 7 as a search key. If an entry of MN 7 exists in the table 320, the SIP process refers to the presence service subscription 323 in the entry. If MN 7 subscribes already to the presence service, the home address 322 (2000:0:0:102::111) of MN 7 is read from the entry to update the entry (61). The address (2000:0:0:102::111) of the presence server 1 read from the SUBSCRIBE message is set to the presence server address 324. "Yes" is set to the presence information acquisition request reception 325. The expiration term in the SUBSCRIBE message is set to the timer 326. Next, HA 2 transmits a SIP response message ("200 OK") indicating a normal completion to the presence server 1 (62, 110).

If it is judged at Step 61 that an entry of MN 7 does not exist in the table 320 or MN 7 does not subscribe to the presence service, HA 2 transmits a SIP response containing an error notice to the presence server 1 (67) to thereafter terminate this routine. Next, in the SIP process 27, the Binding Cache management table 310 is referred to by using as a search key the home address (2000:0:0:102::111) of MN 7 read at Step 61 (63). If an entry of MN 7 exists, a Care of Address 312 (3000:300:1:2::100) is read from the entry. HA 2 sets the home address of MN 7 and the Care of Address read from the entry to the message-body field of a SIP NOTIFY message and transmits it to the presence server 1 (64, 111). FIG. 8 shows an example of the SIP NOTIFY message. An expiration term of the Binding Cache may be set to the message-body field of the SIP NOTIFY message.

Figure 9:
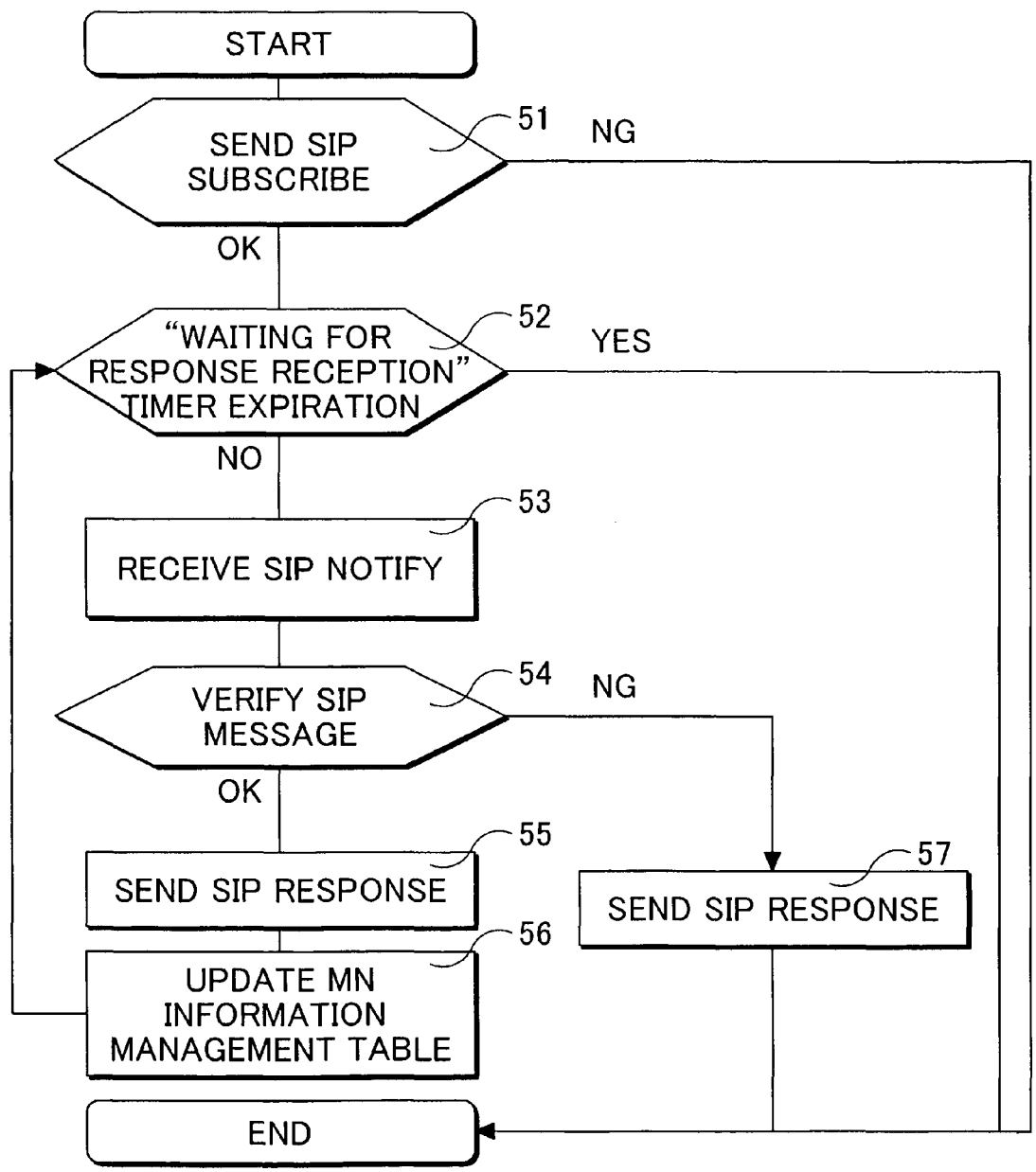
FIG. 9 is a diagram illustrating a Care of Address acquisition routine of a presence information process 18 in the presence server 1.

Reverting to FIG. 9, the presence server 1 receives the SIP NOTIFY message (53), and verifies it (54). More specifically, it is verified whether the SIP NOTIFY message is a message corresponding to the SIP SUBSCRIBE message transmitted at Step 51. If the verification result is OK, the presence server 1 transmits a SIP response message ("200 OK") indicating a normal completion to HA 2 (55, 112) to thereafter terminate this routine. If the verification result is NG, the presence server 1 transmits a SIP response message indicating an error notice to HA 2 (57) to thereafter terminate this routine.

Next, the presence server 1 searches the MN information management table 220 by using SIP URI (sip: mn@example.com) of MN 7 as a search key. If a corresponding entry does not exist, a new entry for MN 7 is created and the home address (2000:0:0:102::111) and Care of Address (3000:300:1:2::100) of MN 7 are set to the entry. If the corresponding entry exists, the presence server 1 updates the MN home address 222 and MN Care of Address 223. The home address and Care of Address of MN 7 are read from the message-body field of the SIP NOTIFY message (56, 113). If the SIP NOTIFY message contains the expiration term of the Binding Cache, the presence server 1 reads the expiration term 224 in the corresponding entry and sets it to the table. Thereafter, the flow returns to Step 52 to repeat the processes from Step 52 to Step 56 until the expiration term of the SIP SUBSCRIBE expires.

Figure 10:
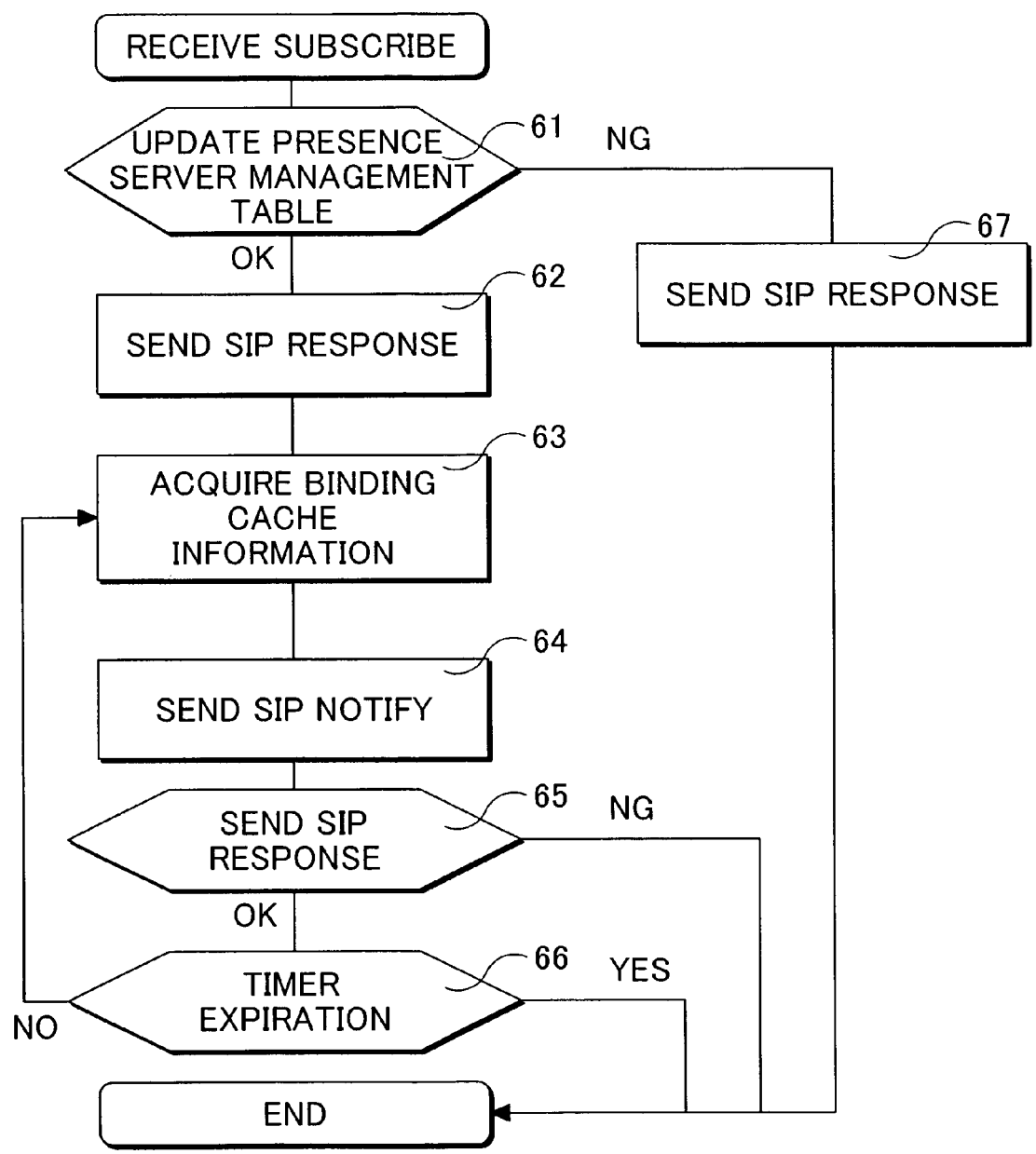
FIG. 10 is a diagram illustrating a Care of Address notification routine of a SIP process 27 in HA 2.

Reverting to FIG. 10, upon reception of the SIP response message ("200 OK") indicating the normal completion (65), HA 2 searches the presence server address management table 320 for notifying Binding information by using SIP URI (sip:mn@example.com) of MN 7 as a search key. If the timer 326 in the entry does not expire, the flow returns to Step S63. If it is judged at Step 66 that the timer 326 in the entry expired or the SIP response message indicating an error notice is received at Step 65, HA 2 terminates this routine.

With the above-described sequence, the presence server 1 acquires location registration information of MN 7 from HA 2.

Next, with reference to the sequence diagram shown in FIG. 15, description will be made on a sequence whereby the information delivery server 3 delivers information to MN 7 by referring to the information of the presence server 1. The information delivery server 3 transmits a SIP SUBSCRIBE message to the presence server 1 in order to request for the presence information of MN 7 (121, 122). The SIP SUBSCRIBE message contains SIP URI of MN 7 and an IP address or SIP URI of the information delivery server 3. In this embodiment, it is assumed that the SIP SUBSCRIBE message contains an IP address (2000:0:0:102::8) of the information delivery server 3.

Upon reception of the SIP SUBSCRIBE message, the presence server 1 refers to the permission information management table 240 by using SIP URI (sip:mn@example.com) of MN 7 as a search key. If a corresponding entry exists, the presence server 1 reads the presence information request source and the permission in the entry. The presence server 1 permits to notify the information delivery server 3 (2000:0:0:102::108) of the presence information of MN 7 (sip:mn@example.com). The presence server 1 transmits a response message ("200 OK") to the information delivery server 3 (123). Next, the presence server 1 refers to the MN information management table 220 by using SIP URI (sip:mn@example.com) as a search key. If a corresponding entry exists, the presence server 1 reads the MN home address 222 (2000:0:0:102::111) and MN Care of Address 223 (3000:300::1:2::100) in the entry. The presence server 1 transmits a SIP NOTIFY message containing the home address and Care of Address of MN 7 to the information delivery server 3 (124, 125).

Figure 13:
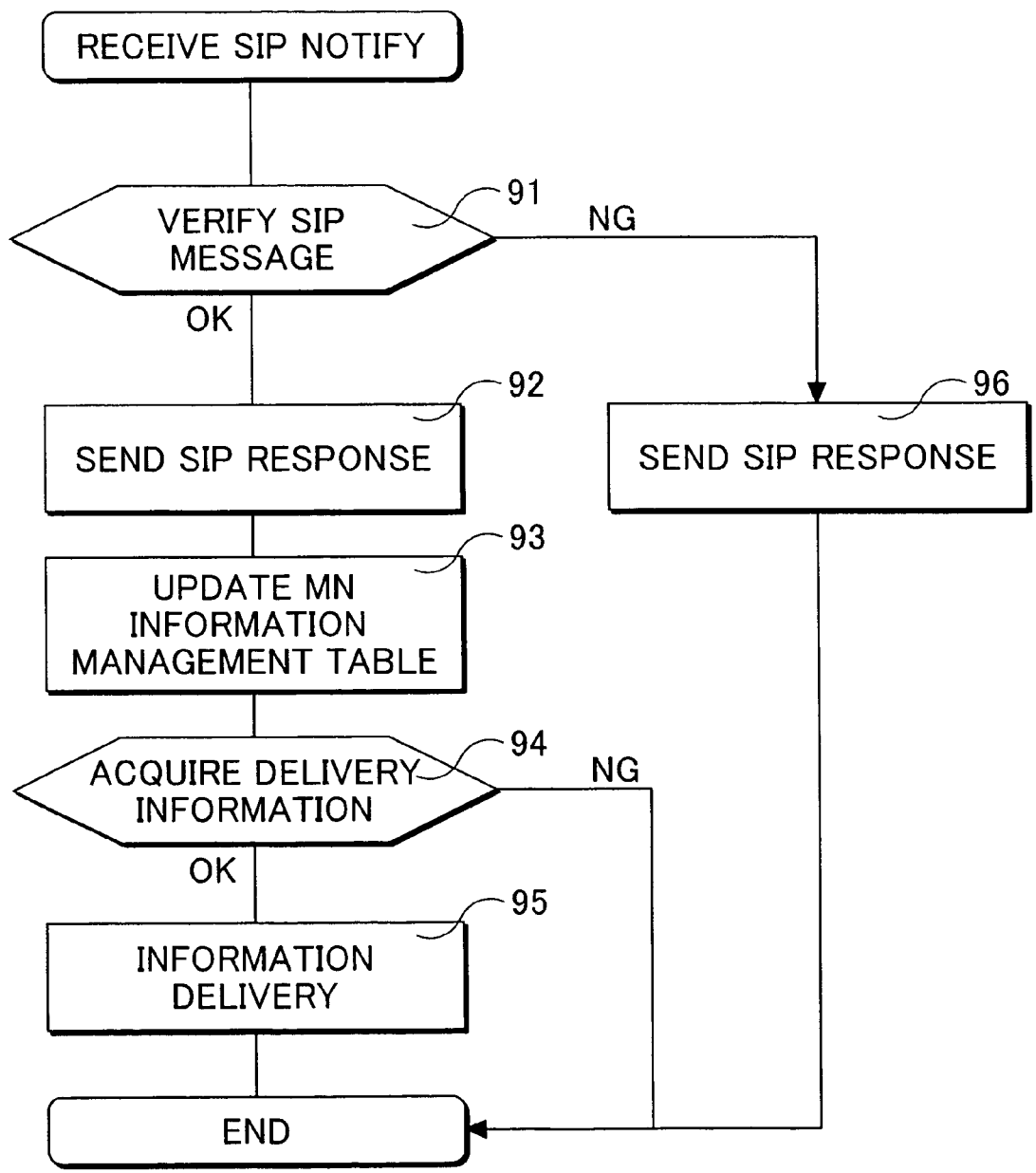
FIG. 13 is a diagram illustrating a delivery information deciding routine in a presence information process 38 in the information delivery server 3.

The following description will be made with reference to also the flow chart of FIG. 13. In the presence information process 38 of the information delivery server 3, upon reception of the SIP NOTIFY message, the delivery information decision routine 90 is activated. First, the presence information process 38 verifies the SIP NOTIFY message (91). If the received message is a message corresponding to the SIP SUBSCRIBE message transmitted at Step 121, the information delivery server 3 transmits a SIP message ("200 OK") indicating a normal response to the presence server 1 (92, 126). If the received message is not a message corresponding to the SIP SUBSCRIBE message transmitted at Step 121, the information delivery server 3 transmits a SIP message indicating an error notice to the presence server 1 (96) to thereafter terminate this routine.

Next, the presence information process 38 in the information delivery server 3 searches the MN information management table 250 by using SIP URI (sip:mn@example.com) as a search key. If a corresponding entry exists, the information delivery server 3 reads the home address and Care of Address of MN 7 from the SIP NOTIFY message received at Step 124, and sets these values to the MN home address 252 (2000:0:0:102::111) and MN Care of Address 253 (3000:300:1:2::100) (93). If the SIP NOTIFY message contains the expiration term of the Binding Cache, a value is set to the expiration term 254 of the table 250. If the corresponding entry does not exist, a new entry of MN 7 is created.

Next, the information delivery server 3 searches the delivery information management table 260 by using as a search key the MN 7 Care of Address or the prefix (300:300:1:2::/64) of the Care of Address stored in the MN information management table at Step 93 (94). If a corresponding entry exists, the delivery information 263 (α) is read. Next, the information delivery server 3 establishes a session to MN 7 to deliver the information. For example, SIP is used as a means for establishing a session between the information delivery server 3 and MN 7. The information delivery server 3 transmits a session establishing request (SIP INVITE) to the MN 7 (127, 128). The session establishing request is transferred from the SIP server 4 to MN 7. MN 7 received the SIP INVITE transmits a SIP message ("200 OK") indicating a normal response to the information delivery server 3 via the SIP server, if the session establishing request is to be acknowledged (129, 130). The information delivery server 3 transmits a response confirmation message to the SIP message to MN 7 (131, 132). With these Steps, the session can be established between the information delivery server 3 and MN 7. Next, the information delivery server 3 transmits the information (α) acquired at Step 94 to MN 7 (95, 134) to thereafter terminate this routine. If it is judged at Step 94 that the corresponding entry does not exist, the information delivery server 3 terminates this routine.

According to the first embodiment of the present invention, a means for the presence server to acquire location registration information of MN from HA is provided. It is therefore possible to provide presence service to MN existing in the network other than the home network. In particular, since the location information of MN is acquired by the presence server from HA, it is not necessary for MN existing in a network other than the home network to transmit Binding information to arbitrary communication partners, so that security can be maintained.

2. Second Embodiment

The second embodiment will be described with reference to the accompanying drawings. The second embodiment is characterized in that HA 2 is provided with a means for notifying the presence server 1 of Binding information of MN in response to the event that HA 2 receives the Mobile IP location registration message. In the second embodiment, HA 2 has a Care of Address acquisition routine 70 in place of the Care of Address notification routine 60, and the presence server has a Care of Address acquisition routine 80 in place of the Care of Address acquisition routine 50.

Figure 16:
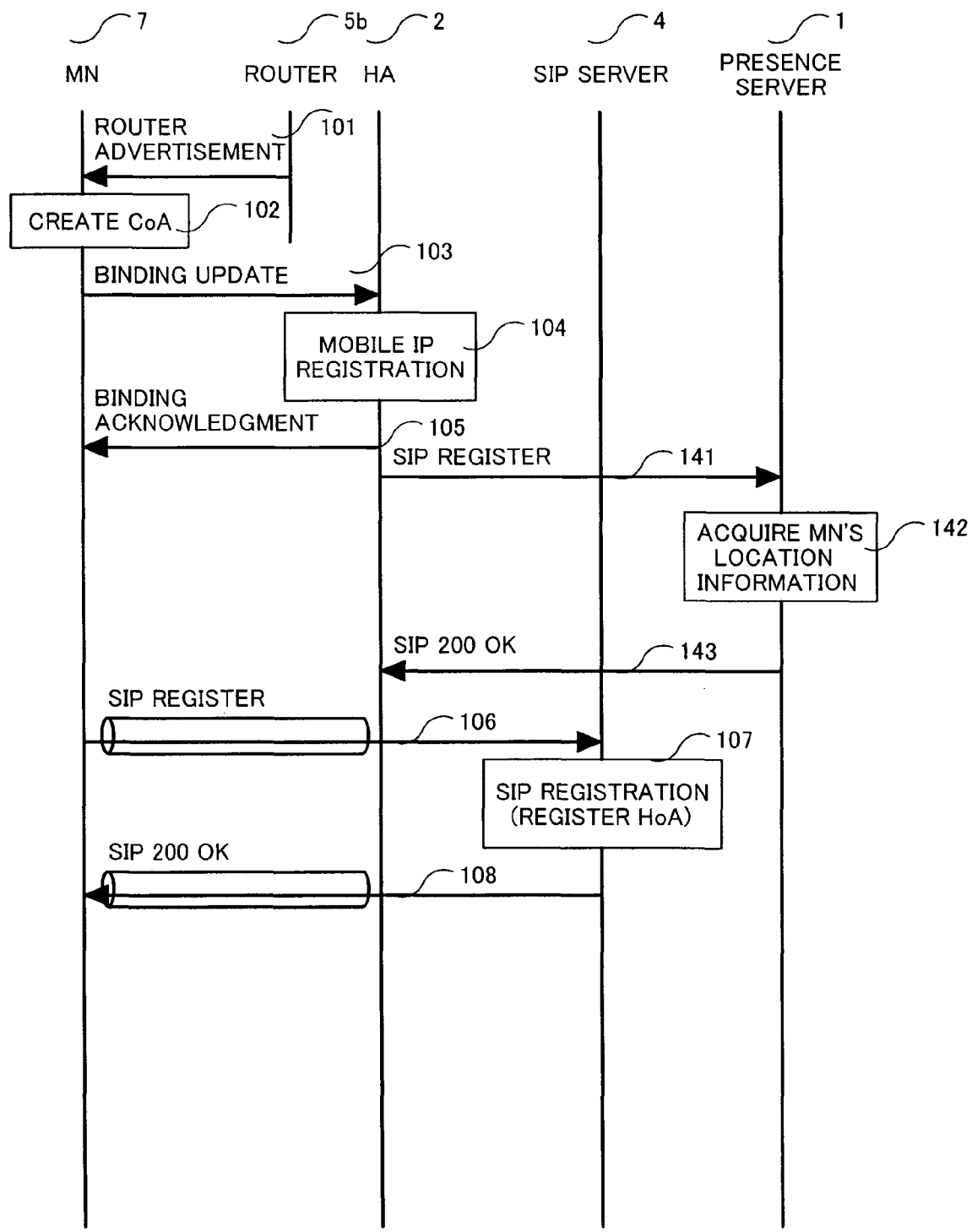
FIG. 16 is a sequence diagram illustrating location registration—presence information notification according to the second embodiment.

It is assumed in the second embodiment that at least "home address" and "presence server address" are set for "SIP URI" in the presence server address management table 320 for notifying Binding information. With reference to the sequence diagram shown in FIG. 16, description will be made on a sequence whereby HA 2 notifies the presence server 1 of the location registration information of MN 7. The process that MN 7 acquires CoA in a visited network and performs location registration in HA 2 (from Step 101 to Step 105) is the same as that of the first embodiment.

Figure 11:
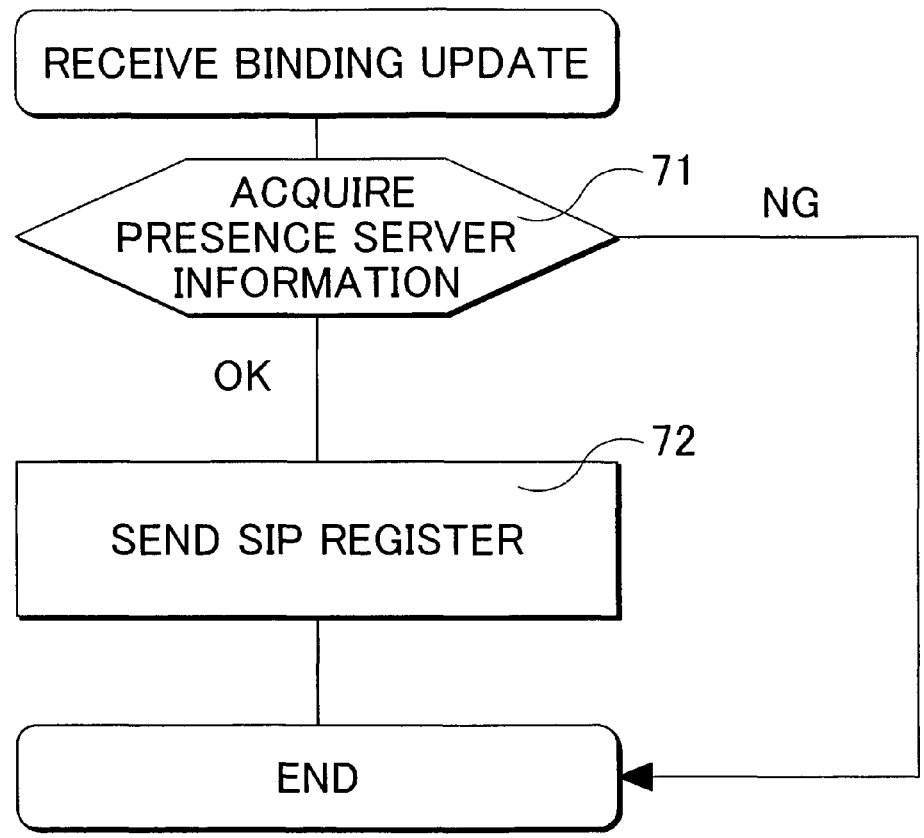
FIG. 11 is a diagram illustrating the Care of Address notification routine of the SIP process 27 in HA 2 according to a second embodiment.

The following description will be made with reference to also the flow chart of FIG. 11. In the Mobile IP process 28 of HA 2, after the completion of location registration of MN, the Care of Address notification routine 70 is activated. HA 2 refers to the presence server address management table 320 for notifying Binding information, by using as a search key the home address (2000:0:0:102::111) of MN 7 received at Step 103. If a corresponding entry exists, the Mobile IP process 28 extracts SIP URI (sip:mn@example.com) of MN 7 and the address 324 (2000:0:0:102::10) of the presence server (71). If it is judged at Step S71 that the corresponding entry does not exist, HA 2 terminates this routine.

HA 2 notifies the presence server 1 identified at Step 71 of the Binding information of MN 7 received at Step 103. A SIP REGISTER message is used for the Binding information notification (7.2, 141). The SIP REGISTER message (141) includes SIP URI of MN 7 read at Step 71 and the Binding information received at Step 103. The Binding information includes at least the home address and Care of Address of MN 7.

Figure 12:
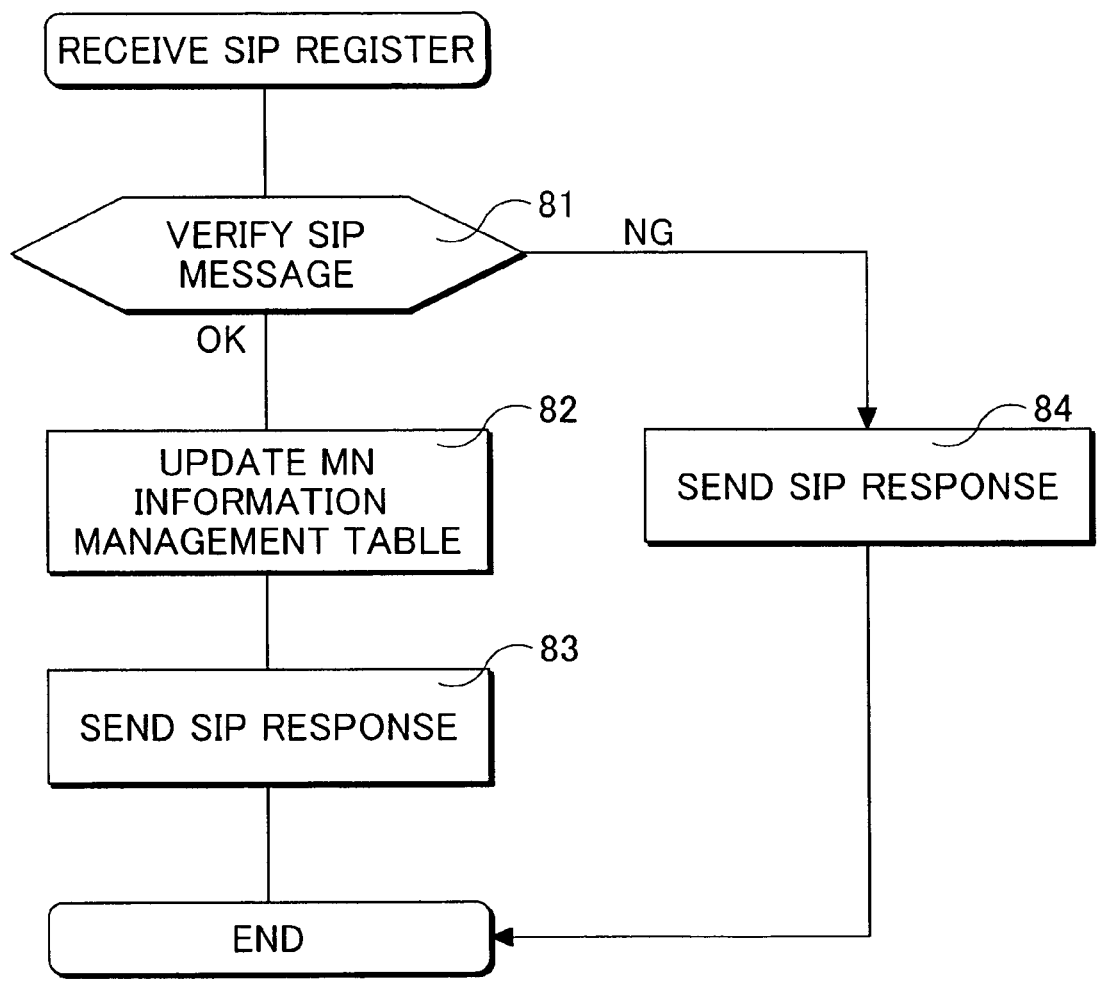
FIG. 12 is a diagram illustrating the Care of Address acquisition routine of the presence information process 18 in the presence server 1 according to the second embodiment.

The following description will be made with reference to also the flow chart of FIG. 12. In the presence information process 18 of the presence server 1, upon reception of the SIP REGISTER message, the Care of Address acquisition routine 80 is activated. First, the presence information process 18 verifies the received SIP message (81). If the presence server 1 permits the SIP message, the presence information process 18 refers to the MN information management table 220, by using SIP URI (sip:mn@example.com) of MN 7 contained in the SIP REGISTER message 141 as a search key. If a corresponding entry exists, the presence server 1 updates the MN home address 222 (2000:0:0:102::111) and MN Care of Address 223 (3000:300:1:2::100) in the entry. The home address and Care of Address of MN 7 are read from the SIP REGISTER message 141 (82, 142). If the corresponding entry does not exist, a new entry is created. Thereafter, the presence server 11 transmits a SIP message ("200 OK") including a normal response to HA 2 (83, 143) to thereafter terminate this routine.

If it is judged at Step 81 that the SIP message is not permitted, the presence server 1 transmits a response message including an error notice to HA to thereafter terminate this routine. The process (from Step 106 to Step 108) that MN 7 performs SIP location registration in the SIP server is the same as that of the first embodiment. The process that the information delivery server 3 delivers information to MN 7 by referring to the information of the presence server 1 is the same as that of the first embodiment.

According to the second embodiment of the present invention, even if the presence server is not provided with the presence information request function relative to HA, the presence server can acquire the Binding information of MN. In particular, since HA notifies the presence server of the MN location information, it is not necessary for MN existing in a network other than the home network to transmit Binding information directly to arbitrary communication partners, so that security can be maintained.

3. Third Embodiment

The third embodiment will be described with reference to the accompanying drawings. The third embodiment is characterized in that HA 2 is provided with a means for the presence server 1 to adopt the Binding information for originating/terminating control, in place of the information delivery service of the first and second embodiments.

Figure 17:
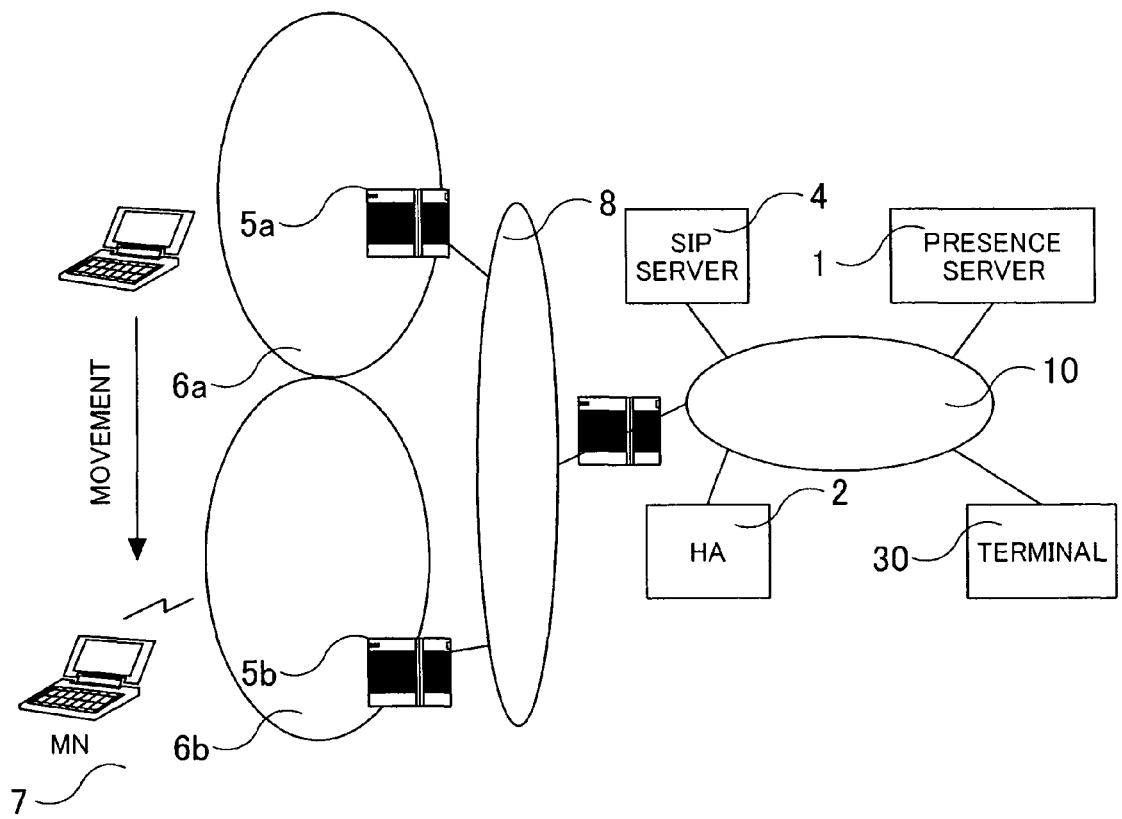
FIG. 17 is a diagram showing an example of the configuration of a communication network according to a third embodiment of the invention.

FIG. 17 shows an example of the configuration of a communication network according to the third embodiment of the present invention. In FIG. 17, although a terminal 30 is connected to a home network 10, it may be connected to a network other than the home network 10. The third embodiment is characterized in that the presence server 1 has an originating/terminating information management table 230.

FIG. 18 shows an example of the table form of the originating/terminating information management table 230. The originating/terminating information management table 230 stores the correspondence relation between originating call information (allow/refuse) 232 and terminating call information (allow/refuse) 233 for an MN Care of Address 231. The MN Care of Address 231 may be replaced with the prefix of the Care of Address (e.g., 3000:300:1:2::/64).

Figure 19:
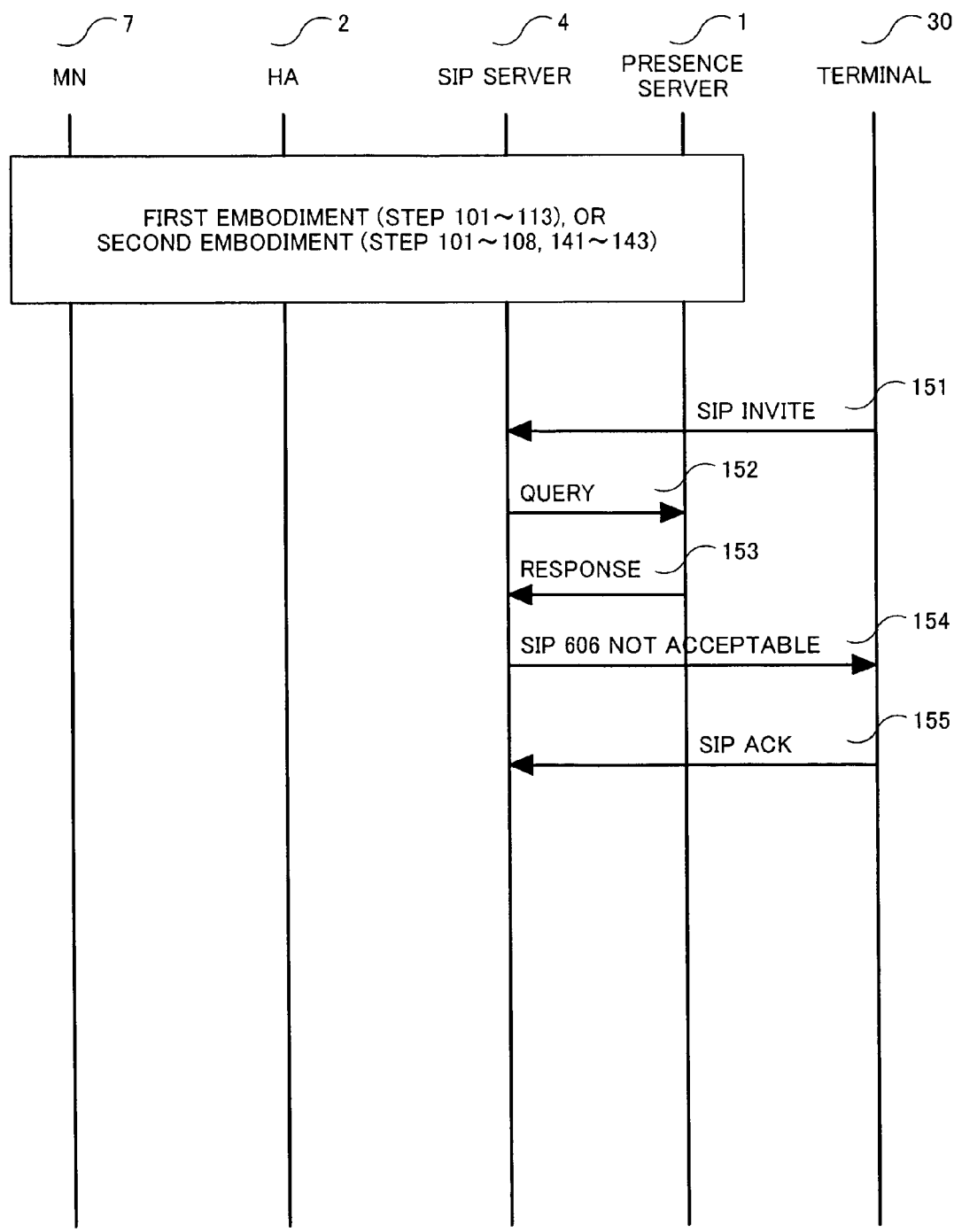
FIG. 19 is a sequence diagram illustrating packet transmission/reception according to the third embodiment.

With reference to the sequence diagram of FIG. 19, description will be made on a control process that the terminal 30 shown in FIG. 17 calls MN 7 in a visited network 6b. A method that the presence server 1 acquires the Binding information of MN 7 is the same as that of the first and second embodiments.

The terminal 30 in the home network 10 requests MN 7 for session establishment (SIP INVITE) (151). SIP INVITE includes SIP URI (sip:mn@example.com) of MN 7. The SIP server 4 received SIP INVITE issues a query about the presence information of MN 7 to the presence server (152). The query (152) contains SIP URI of MN 7. Upon reception of the query (152), the presence server 1 refers to the MN information management table 220 by using SIP URI (sip:mn@example.com) of MN 7 as a search key. If a corresponding entry exists, the Care of Address 223 (3000:300:1:2::100) of MN 7 is read from the entry. Next, the presence server 1 refers to the originating/terminating information management table 230 by using as a search key the Care of Address of MN 7 or the prefix of the Care of Address of MN 7. If a corresponding entry exists, the presence server 1 reads the originating call information (allow/reject) 232 and terminating call information (allow/reject) 233 from the entry. It is herein assumed that "terminating call reject" is set to the prefix (3000:300:1:2::/64) of the Care of Address of MN 7. As the "terminating call reject" is set, the presence server 1 transmits a response message including a terminating call reject to the SIP server 4 (153). The SIP server 4 received the message (153) transmits a SIP response message (e.g., "606 NOT Acceptable" indicating reception inability) including an error notice to a terminal 30 as a response to the session establishment request (151) (154). The terminal 30 transmits a response confirmation to the message 154 to the SIP server 4 (155).

According to the third embodiment of the present invention, the presence server is provided with the means for acquiring the Binding information of MN, and with the originating/terminating control information corresponding to the Care of Address or the prefix of the Care of Address. It is therefore possible to provide originating/terminating control service in accordance with the visited network address of MN.

4. Fourth Embodiment

Figure 20:
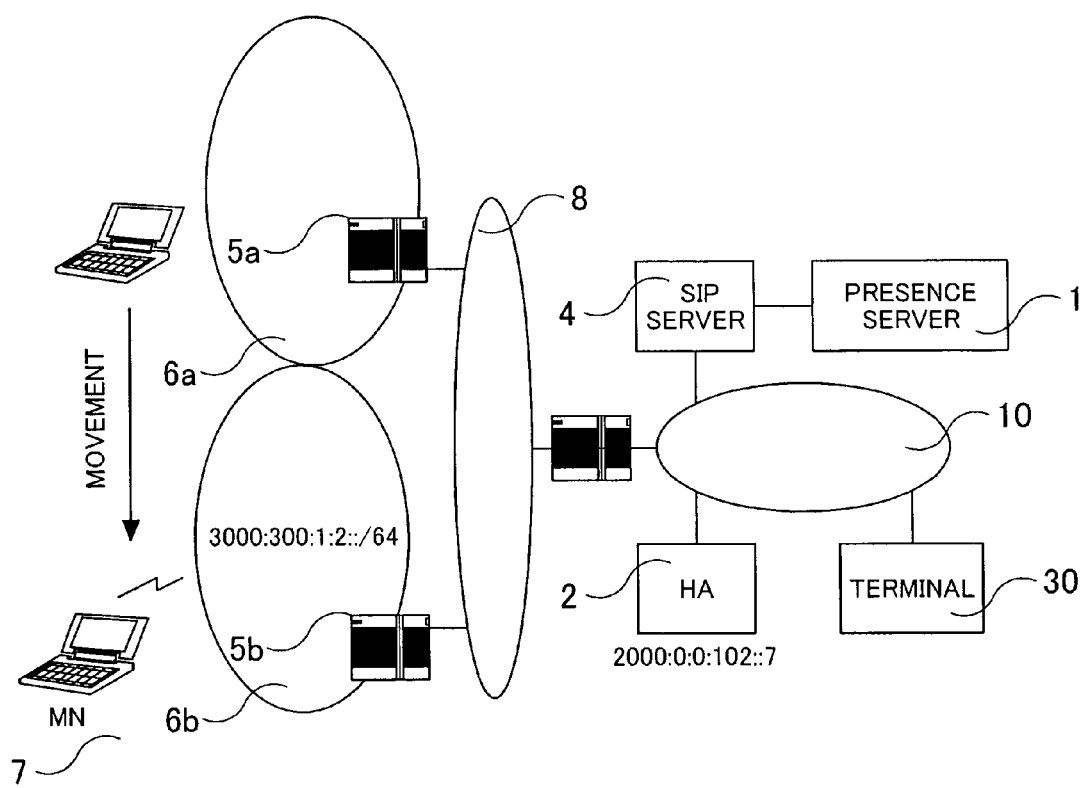
FIG. 20 is a diagram showing an example of the configuration of a communication network according to a fourth embodiment of the invention.

The fourth embodiment will be described with reference to the accompanying drawings. FIG. 20 shows an example of the configuration of a communication network according to the fourth embodiment of the invention. In FIG. 20, the presence server 1 is connected to the SIP server 4. A relay network may be disposed between the presence server 1 and SIP server 4.

The fourth embodiment is characterized in that the SIP server 4 has a means for storing the Binding information of MN, the means being used when the SIP server 4 relays a message between HA 2 and the presence server 1.

Figure 21:
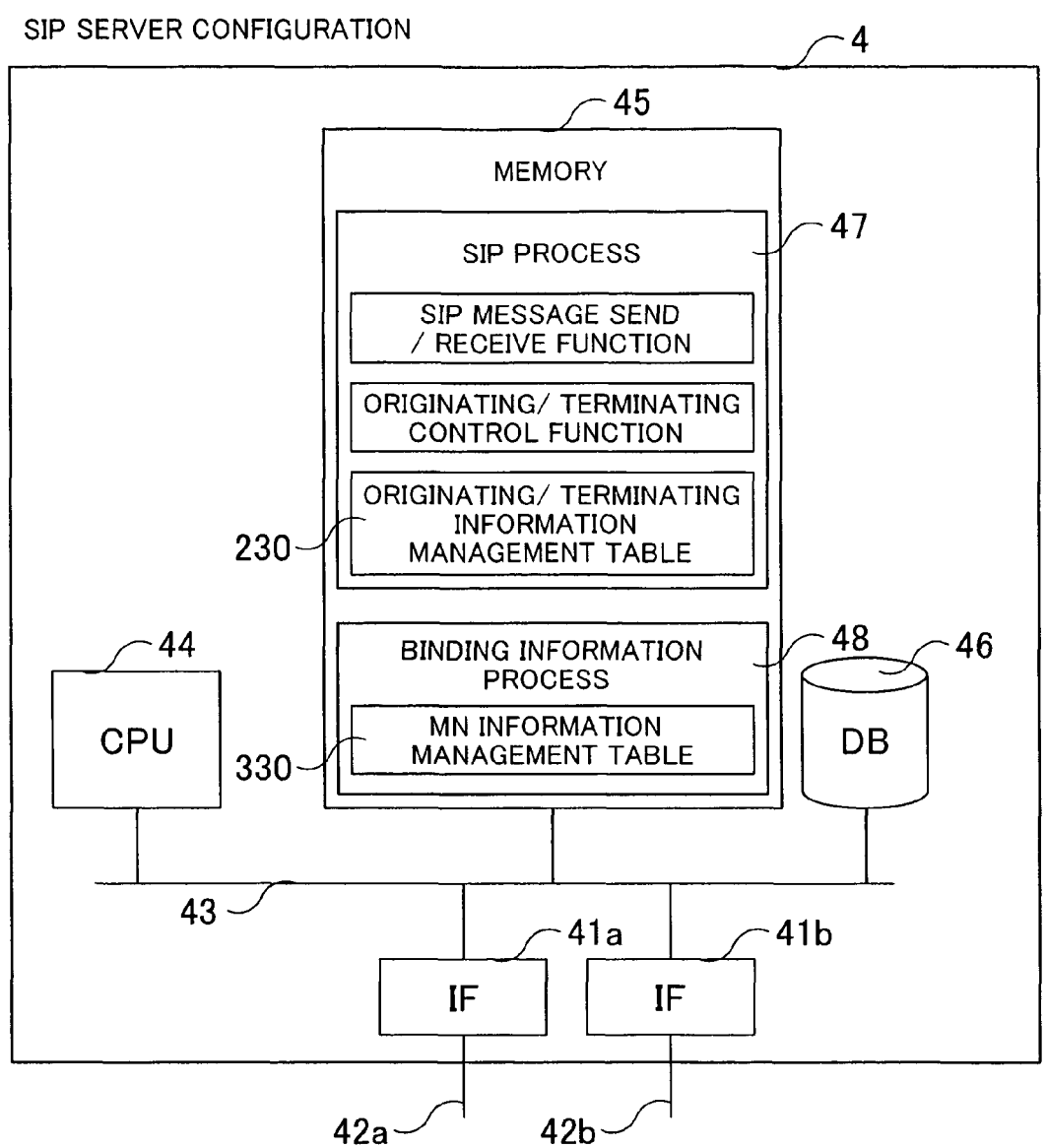
FIG. 21 is a block diagram of a SIP server 4 according to the fourth embodiment.

FIG. 21 shows an example of the configuration of the SIP server 4. The SIP server 4 is constituted of an interface (IF) unit 41 (41a, 41b) accommodating a line 42 (42a, 42b), a CPU 44, a memory 45 and a database 46. Respective constituent elements are connected by a bus 43.

In the fourth embodiment, the memory 45 stores programs for executing a SIP process 47 and programs for executing a Binding information process 48. The SIP process 47 has a function of sending/receiving a SIP message and an originating/terminating control function. The SIP process 47 includes the originating/terminating information management table 230 shown in FIG. 18. The Binding information process 48 has a function of managing Binding information of a terminal. The Binding information process 48 includes an MN information management table 330. The database 46 may include the MN information management table 330 and the originating/terminating information management table 230.

FIG. 22 shows an example of the table form of the MN information management table 330. The HA information management table 330 stores the correspondence relation between a SIP URI 331 as the MN SIP identifier, and at least an MN home address 332, an MN Care of Address 333. For example, an entry 330-1 stores the correspondence relation between an SIP URI (sip:mn@example.com), a home address (2000:0:0:102::111), and a Care of Address (3000:300:1:2::100). The MN information management table 330 may include an expiration term 334 of MN Binding information. If the MN information management table 330 includes the expiration term 334, the SIP server 4 can delete the MN entry over the expiration term.

Figure 23:
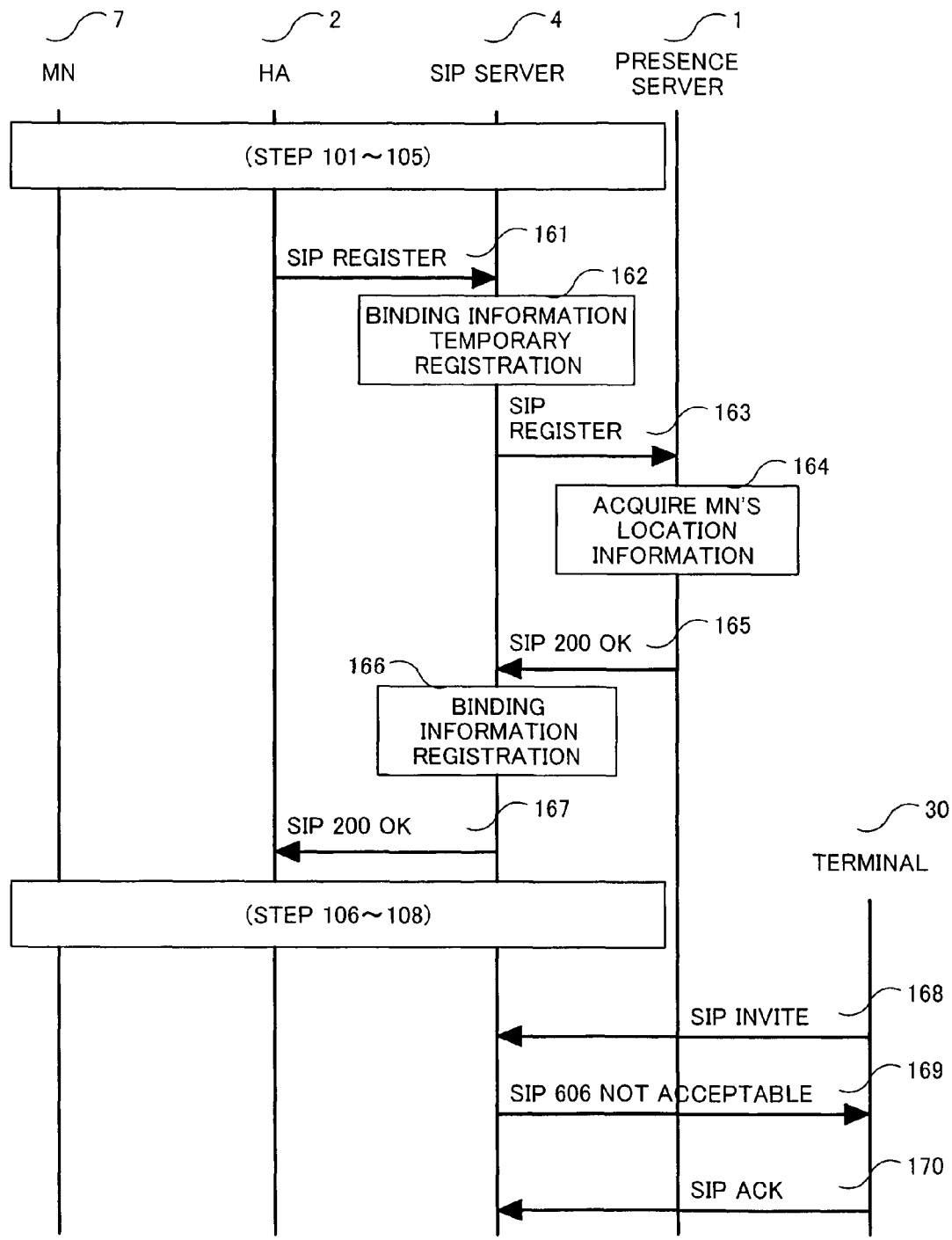
FIG. 23 is a sequence diagram illustrating location registration—presence information notification according to the fourth embodiment.

With reference to the sequence diagram shown in FIG. 23, description will be made on a process of referring to a message which is relayed by the SIP server 4 between HA 2 and the presence server 1. Description will be made on a case in which HA 2 is provided with a means for HA 2 to notify Binding information to the presence server 1 in response to an event that HA 2 receives a Mobile IP location registration message. A process (from Step 101 to Step 105) that MN 7 acquires CoA in a visited network and performs location registration in HA 2 is the same as that of the first and second embodiments.

After the completion of MN location registration, HA 2 notifies the presence server 1 of the MN 7 Binding information. Steps of HA 2 are the same as those of the second embodiment. The SIP REGISTER message (161) is used for Binding message notification. The SIP REGISTER message (161) includes SIP URI of MN 7 and Binding information. The Binding information contains at least the home address and Care of Address of MN 7.

The SIP server 4 relays the SIP REGISTER message (161). If the SIP REGISTER message is a message destined to the presence server 1, the SIP server 4 verifies the message. If the message contains the Binding information of MN 7, the SIP server 4 refers to the MN information management table 330 by using SIP URI (sip:mn@example.com) of MN 7 as a search key. If a corresponding entry exists, the SIP server 4 temporarily registers the MN home address 332 (2000:0:0: 102::111) and MN Care of Address 333 (3000:300:1:2::100) in the entry (162). The home address and Care of Address of MN 7 are read from the SIP REGISTER message (161). If the corresponding entry does not exists, a new entry is created. Thereafter, the SIP server 4 transmits the SIP REGISTER message to the presence server 1 (163).

Upon reception of the SIP REGISTER message, the presence server 1 stores the MN Binding information similar to the second embodiment, and transmits a SIP response message (164, 165).

If the SIP response message indicates a normal response and is a message corresponding to the SIP REGISTER transmitted at Step 163, the SIP server 4 formally registers the entry preliminarily registered at Step 162 (166). Thereafter, the SIP server 4 transmits a SIP response message to HA 2 (167). A process (from Step 106 to Step 108) that MN 7 performs SIP location registration in the SIP server 4 is the same as that of the first and second embodiments.

Next, description will be made on a control process that the terminal 30 calls MN 7 visited in the network 6b.

The terminal 30 in the home network 30 requests MN 7 for session establishment (SIP INVITE) (168). SIP INVITE includes SIP URI (sip:mn@example.com) of MN 7. The SIP server 4 received SIP INVITE refers to the MN information management table 330 by using SIP URI (sip:mn@example.com) of MN 7 as a search key. If a corresponding entry exists, the Care of Address 333 (3000:300:1:2::100) of MN 7 is read from the entry. Next, the SIP server refers to the originating/terminating information management table 230 by using the Care of Address of MN 7 or the prefix of the Care of Address of MN 7. If a corresponding entry exists, the SIP server 4 reads the originating call information (allow/reject) 232 and terminating call information (allow/reject) 233 from the entry. It is herein assumed that "terminating call reject" is set to the prefix (3000:300:1:2::/64) of the Care of Address of MN 7. As the "terminating call reject" is set, the SIP server 4 transmits a SIP response message (e.g., "606 NOT Acceptable" indicating reception inability) to a terminal 30 as a response to the session establishment request (168) (169). The terminal 30 transmits a response confirmation to the message 169 to the SIP server 4 (170).

According to the third embodiment of the present invention, since the SIP server is provided with the Binding information of MN and the originating/terminating control function, the SIP server can provide originating/terminating control service suitable for the address of MN in a visited network, without issuing a query to the presence server.

By adopting the present invention, a communication terminal can provide service suitable for the Care of Address to a Mobile IP compatible mobile terminal in a visited network. The present invention is also applicable to the case in which communication service suitable for the Care of Address is provided to a Mobile IP compatible mobile terminal.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A communication apparatus connected to a terminal and a presence server via a network, comprising:
    a CPU;
    a memory for storing location information of said terminal; and
    a transmission/reception unit for receiving one of a Home Address and a Care of Address included in binding information of a Mobile IP, which is said location information of said terminal, from said terminal and transmitting said Care of Address and said Home Address associated with each other to said presence server, and
    wherein said memory further stores service subscriber information, and said location information of said terminal is transmitted to said presence server if it is judged from said service subscriber information that said terminal is a service subscriber, and
    wherein said service subscriber information stores information indicating a correspondence relation between an identifier of said terminal and said presence server.

2. The communication apparatus according to claim 1, wherein said location information is Binding information of Mobile IP.

3. The communication apparatus according to claim 1, wherein the communication apparatus receives an information notification request from said presence server and returns said location information of said terminal.

4. A state information managing apparatus connected via a network to a terminal and a server for managing binding information of a Mobile IP of said terminal, comprising:
   a CPU;
   a transmission/reception unit for receiving a Care of Address included in said binding information of a Mobile IP of said terminal from said server; and
   a memory for storing said received Care of Address of said terminal associated with a Home Address of said terminal, and
   wherein said transmission/reception unit transmits said Care of Address and said Home Address associated with each other to a presence server managing presence information of the terminal,
   wherein the state information managing apparatus is further connected to a service server via the network, and said transmission/reception unit further receives a reference request from said service server and receives said location information of said terminal, and
   wherein said CPU judges whether said service server can refer to said location information of said terminal, and said transmission/reception unit transmits said location information to said service server, if it is judged that said service server can refer to said location information.

5. The state information managing apparatus according to claim 4, wherein said location information of said terminal is Binding information of Mobile IP.

6. The state information managing apparatus according to claim 4, wherein said service server is an information delivery server.

7. A communication system connected to a terminal and having a terminal location information management server, a presence server and a service server, wherein:
   said terminal location information management server comprises a transmission/reception unit for receiving a Care of Address included in binding information of a Mobile IP of said terminal from said terminal and transmitting said Care of Address and a Home Address of said terminal associated with each other to said presence server;
   said presence server comprises a transmission/reception unit for receiving said Care of Address and said Home Address of said terminal from said terminal location information management server and transmitting said Care of Address and said Home Address of said terminal associated with each other to said service server;
   said service server comprises a transmission/reception unit for receiving said Care of Address and said Home Address of said terminal from said presence server and transmitting data corresponding to said Care of Address to said terminal; and
   wherein said transmission/reception unit of said terminal location information management server receives an information notification request from said presence server and returns said location information of said terminal.

8. The communication system according to claim 7, wherein said location information is Binding information of Mobile IP and said terminal location information management server is a home agent.

9. The communication system according to claim 7, wherein said service server is an information delivery server.

10. The communication system according to claim 7, wherein said transmission/reception unit of said presence server receives an information reference request from said service server and returns said location information of said terminal.

\* \* \* \* \*